US009983892B2

(12) United States Patent
Desineni et al.

(10) Patent No.: US 9,983,892 B2
(45) Date of Patent: May 29, 2018

(54) DEEP LINKING TO MOBILE APPLICATION STATES THROUGH PROGRAMMATIC REPLAY OF USER INTERFACE EVENTS

(71) Applicant: Samsung Electronics Co., Ltd., Suwon-si, Gyeonggi-do (KR)

(72) Inventors: Kalyan Desineni, Mountain View, CA (US); Matan Levi, Mountain View, CA (US); Manikandan Sankaranarasimhan, Hayward, CA (US); Danny Tsechansky, Mountain View (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/235,859

(22) Filed: Aug. 12, 2016

(65) Prior Publication Data

US 2017/0132024 A1    May 11, 2017

Related U.S. Application Data

(60) Provisional application No. 62/274,155, filed on Dec. 31, 2015, provisional application No. 62/252,367, filed on Nov. 6, 2015.

(51) Int. Cl.
  *G06F 9/44* (2006.01)
  *G06F 9/445* (2018.01)
(52) U.S. Cl.
  CPC ............ *G06F 9/44521* (2013.01); *G06F 8/61* (2013.01); *G06F 9/44* (2013.01)
(58) Field of Classification Search
  CPC ........... G06F 9/44521; G06F 8/61; G06F 9/44
  See application file for complete search history.

(56) References Cited

U.S. PATENT DOCUMENTS 4,833,604 A * 5/1989 Cheng ................. G06F 9/44521
6,405,362 B1 * 6/2002 Shih ......................... G06F 8/61
                                                         713/1

(Continued)

FOREIGN PATENT DOCUMENTS

EP          2728474 A1     5/2014
KR     20130112613 A     10/2013

OTHER PUBLICATIONS

Lenin Ravindranath et al., "AppInsight: Mobile App Performance Monitoring in the Wild", [Online], 2012, pp. 107-120, [Retrieved from Internet on Jun. 6, 2017], <https://www.usenix.org/system/files/conference/osdi12/osdi12-final-91.pdf>.*

(Continued)

*Primary Examiner* — Ziaul A Chowdhury
(74) *Attorney, Agent, or Firm* — Jefferson IP Law, LLP

(57) ABSTRACT

A mobile application development system includes a developer portal that receives a first application from a first developer and provides a routing library to the first developer for incorporation into the first application. An offline analysis system executes the first application and, during execution, monitors a sequence of user interface (UI) events initiated by an operator starting from an initial state and proceeding to a first state. The offline analysis system stores the sequence of UI events as a first data structure corresponding to the first state. The routing library includes instructions that, subsequent to installation of a copy of the first application in a user device, receive a link from an operating system of the user device identifying the first state and, based on the first data structure corresponding to the first state, replay, in order, each UI event from the sequence of UI events to the first application.

17 Claims, 11 Drawing Sheets

(56) References Cited

U.S. PATENT DOCUMENTS

| | | | |
|---|---|---|---|
| 6,996,798 B2 | 2/2006 | Ali et al. | |
| 7,437,358 B2 | 10/2008 | Arrouye et al. | |
| 7,721,219 B2* | 5/2010 | Harsh | G06F 8/38 |
| | | | 715/239 |
| 7,756,890 B2 | 7/2010 | Carter | |
| 7,870,499 B2 | 1/2011 | Latzina et al. | |
| 7,873,353 B2 | 1/2011 | Kloba et al. | |
| 8,326,858 B2 | 12/2012 | Jenson et al. | |
| 8,489,591 B2 | 7/2013 | Wolosin et al. | |
| 8,762,360 B2 | 6/2014 | Jiang et al. | |
| 8,966,407 B2 | 2/2015 | Shacham et al. | |
| 9,055,343 B1 | 6/2015 | Lewis et al. | |
| 9,146,972 B2 | 9/2015 | Chang et al. | |
| 9,256,697 B2 | 2/2016 | Jiang et al. | |
| 9,336,525 B2 | 5/2016 | Singh et al. | |
| 9,424,006 B2 | 8/2016 | Abadi et al. | |
| 9,438,956 B2 | 9/2016 | Miller et al. | |
| 9,538,319 B1 | 1/2017 | Gigliotti et al. | |
| 9,645,980 B1* | 5/2017 | Kim | G06F 17/2235 |
| 9,692,752 B2* | 6/2017 | Keys | H04L 63/0838 |
| 2002/0002637 A1* | 1/2002 | Takeda | G06F 9/44521 |
| | | | 719/331 |
| 2002/0052916 A1 | 5/2002 | Kloba et al. | |
| 2002/0059425 A1* | 5/2002 | Belfiore | G06F 9/54 |
| | | | 709/226 |
| 2002/0194399 A1* | 12/2002 | Asakura | G06F 9/44521 |
| | | | 719/331 |
| 2003/0079215 A1* | 4/2003 | Hundt | G06F 9/44521 |
| | | | 717/164 |
| 2003/0088865 A1* | 5/2003 | Lim | G06F 9/44521 |
| | | | 717/167 |
| 2005/0034121 A1* | 2/2005 | Fisher | G06F 8/61 |
| | | | 717/175 |
| 2005/0228775 A1 | 10/2005 | Nilsen et al. | |
| 2007/0067373 A1* | 3/2007 | Higgins | G06F 11/3013 |
| 2007/0180380 A1 | 8/2007 | Khavari et al. | |
| 2008/0200161 A1 | 8/2008 | Morse et al. | |
| 2008/0214157 A1 | 9/2008 | Ramer et al. | |
| 2008/0222160 A1* | 9/2008 | MacDonald | G06F 8/61 |
| 2010/0115612 A1* | 5/2010 | O'Brien et al. | G06F 15/0291 |
| | | | 726/22 |
| 2011/0066972 A1* | 3/2011 | Sugiura | G06F 8/61 |
| | | | 715/806 |
| 2011/0151979 A1 | 6/2011 | Boesen et al. | |
| 2011/0154287 A1 | 6/2011 | Mukkamala et al. | |
| 2011/0225569 A1* | 9/2011 | Beaty | G06F 11/3414 |
| | | | 717/127 |
| 2011/0307897 A1* | 12/2011 | Atterbury | G06F 9/4436 |
| | | | 718/102 |
| 2012/0011167 A1 | 1/2012 | Schmidt | |
| 2012/0096366 A1 | 4/2012 | Narla et al. | |
| 2012/0124061 A1 | 5/2012 | Macbeth et al. | |
| 2012/0130801 A1 | 5/2012 | Baranov et al. | |
| 2013/0110815 A1* | 5/2013 | Tankovich | G06F 17/30887 |
| | | | 707/711 |
| 2013/0111328 A1 | 5/2013 | Khanna et al. | |
| 2013/0218836 A1 | 8/2013 | Sullivan et al. | |
| 2013/0232128 A1* | 9/2013 | Krishnan | G06F 17/30864 |
| | | | 707/706 |
| 2013/0247006 A1* | 9/2013 | Trowbridge | G06F 9/44 |
| | | | 717/126 |
| 2013/0304729 A1 | 11/2013 | Jiang et al. | |
| 2013/0318207 A1 | 11/2013 | Dotter | |
| 2014/0026113 A1 | 1/2014 | Farooqi | |
| 2014/0109080 A1* | 4/2014 | Ricci | G06F 8/61 |
| | | | 717/174 |
| 2014/0129265 A1 | 5/2014 | Arena et al. | |
| 2014/0281891 A1* | 9/2014 | Sulcer | G06F 3/0484 |
| | | | 715/234 |
| 2014/0310724 A1* | 10/2014 | Chan | G06F 11/3688 |
| | | | 719/313 |
| 2014/0325556 A1* | 10/2014 | Hoang | H04N 21/431 |
| | | | 725/32 |
| 2014/0359519 A1* | 12/2014 | Luu | G06F 17/30991 |
| | | | 715/780 |
| 2015/0040104 A1* | 2/2015 | Mall | H04L 41/082 |
| | | | 717/121 |
| 2015/0074407 A1 | 3/2015 | Palmeri et al. | |
| 2015/0082239 A1 | 3/2015 | Zhao et al. | |
| 2015/0156061 A1 | 6/2015 | Saxena et al. | |
| 2015/0178724 A1 | 6/2015 | Ngo et al. | |
| 2015/0185997 A1 | 7/2015 | Jain | |
| 2015/0309789 A1 | 10/2015 | Thorat | |
| 2015/0309811 A1* | 10/2015 | Wisgo | H04W 4/00 |
| | | | 719/331 |
| 2015/0339746 A1* | 11/2015 | Desai | G06Q 20/322 |
| | | | 705/26.41 |
| 2015/0379152 A1 | 12/2015 | Bentley et al. | |
| 2016/0021215 A1 | 1/2016 | Spencer | |
| 2016/0092339 A1* | 3/2016 | Straub | H04L 67/26 |
| | | | 717/124 |
| 2016/0094654 A1 | 3/2016 | Raman et al. | |
| 2016/0117388 A1 | 4/2016 | Fan | |
| 2016/0142858 A1 | 5/2016 | Molinet et al. | |
| 2016/0142859 A1 | 5/2016 | Molinet et al. | |
| 2016/0239284 A1 | 8/2016 | Boudville | |
| 2016/0292728 A1 | 10/2016 | Kang et al. | |
| 2016/0335333 A1 | 11/2016 | Desineni et al. | |
| 2017/0031874 A1 | 2/2017 | Boudville | |
| 2017/0046141 A1 | 2/2017 | Desineni et al. | |
| 2017/0046142 A1 | 2/2017 | Desineni et al. | |
| 2017/0046180 A1 | 2/2017 | Desineni et al. | |
| 2017/0076471 A1 | 3/2017 | Prophete et al. | |
| 2017/0132023 A1 | 5/2017 | Desineni et al. | |

OTHER PUBLICATIONS

Piotr Bar et al., "Towards a Monitoring Feedback Loop for Cloud Applications", [Online], 2013, pp. 43-44, [Retrieved from Internet on Jun. 6, 2017], <https://research.spec.org/icpe_proceedings/2013/multicloud/p43.pdf>.*

Ben Medler et al., "Data Cracker: Developing a Visual Game Analytic Tool for Analyzing Online Gameplay", [Online], 2011, pp. 1-10, [Retrieved from Interent on Jun. 6, 2017], <http://delivery.acm.org/10.1145/1980000/1979288/p2365-medler.pdf>.*

Mehmet A.Nacar et al., "GTLAB: Grid Tag Libraries Supporting Workflows within Science Gateways", [Online], 2007, pp. 194-199, [Retrieved from Internet on Jun. 6, 2017], <http://ieeexplore.ieee.org/stamp/stamp.jsp?arnumber=4438533>.*

Tanzirul Azim et al., "uLink: Enabling User-Defined Deep Linking to App Content", [Online], 2016, pp. 1-14, [Retrieved from Internet on Feb. 5, 2018], <https://www.microsoft.com/en-us/research/wp-content/uploads/2016/06/uLink-mobisysl 6.pdf>.*

Victor Grishchenko, "Deep Hypertext with Embedded Revision Control Implemented in Regular Expressions", [Online], 2010, pp. 1-10, [Retrieved from Internet on Feb. 5, 2018], <http://delivery.acm.org/10.1145/1840000/1832777/a3-grishchenko.pdf>.*

MDL ("Mobile Deep Linking"), dated on 2014 Source: MobileDeepLinking.org, Link: http://mobiledeeplinking.org.

International Search Report and Written Opinion for PCT Application No. PCT/IB2016/054880, dated Dec. 2, 2016, 11 pages.

Breaking and Fixing Origin-Based Access Control in Hybrid Web/Mobile Application Frameworks—Martin Georgiev, Suman Jana, and Vitaly Shmatikov—The University of Texas at Austin—NDDS Symp. Feb. 2014; 2014: 1-15.

U.S. Appl. No. 14/984,642, filed Dec. 30, 2015, Kalyan Desineni.

U.S. Appl. No. 15/235,650, filed Aug. 12, 2016, Kalyan Desineni et al.

U.S. Appl. No. 15/236,140, filed Aug. 12, 2016, Kalyan Desineni et al.

Austin, Alex. "Technical Guide to Android Deep Linking: URI Schemes". Blog.branch.io. N.p., 2016. Web. Aug. 8, 2016.

Buchanan, Bryce et al. "The Right Way to Swizzle in Objective-C". New Relic blog. N.p., 2016. Web. Apr. 16, 2014.

International Search Report and Written Opinion for PCT Application No. PCT/IB2016/055211 mailed Dec. 8, 2016.

(56) References Cited

OTHER PUBLICATIONS

International Search Report and Written Opinion for PCT Application No. PCT/IB2016/055213 mailed Dec. 16, 2016.
Internet Engineering Task Force (IETF)—URI Template—J. Gregorio, Google—R. Fielding, Adobe—M. Hadley, MITRE—M. Nottingham, Rackspace—D. Orhcard, Salesforce.com—Mar. 2012.

* cited by examiner

DEEP LINKING TO MOBILE APPLICATION STATES THROUGH PROGRAMMATIC REPLAY OF USER INTERFACE EVENTS

CROSS-REFERENCE TO RELATED APPLICATIONS

This application claims the benefit of U.S. Provisional Application No. 62/274,155, filed Dec. 31, 2015, and U.S. Provisional Application No. 62/252,367, filed Nov. 6, 2015. The entire disclosures of the applications referenced above are incorporated by reference.

FIELD

The present disclosure relates generally to mobile application development and more specifically to deep linking to specific states of mobile applications.

BACKGROUND

This section provides background information related to the present disclosure, which is not necessarily prior art.

An application (referred to interchangeably in this disclosure as an "app"), such as a mobile app, may contain multiple deep states. For example, in an app that rates the quality of restaurants based on social media opinion data, the detail page for each restaurant would be considered a deep state. Deep states are reachable from within the app through a sequence of user actions that can involve navigating through multiple menu screens (or, views) and selections of user interface elements. Each of these menu screens and user interface elements can be mediated by a unique view controller associated with that displayed screen.

Usually, these deep states are accessible only from within the app itself. Web search engines operating outside the app, for example, cannot reach the deep states within the app. This means that when a user conducts a conventional web search for restaurants and wants to explore one of the returned choices in a specialized restaurant rating app, the user would have to manually copy and paste the name of the selected search result into the search field of the restaurant rating app and command the restaurant ranking app to access its internal deep state corresponding to the selected restaurant. Much user interaction is required.

If deep states of apps could be exposed to external apps and computer processes, the user could enjoy the augmented functionality, for example, of being able to begin a search for a suitable restaurant using an Internet-based search server and then to have one of the results of that search automatically lead to the appropriate deep linked page of a specialized restaurant ranking app.

However, implementing such functionality requires developer effort and requires deep linking expertise that the developer may not possess. When app development is limited by time, budget, or expertise, deep link functionality for some or even all of the states of an app may not be a high enough priority to get implemented.

In FIG. 1, a graphical representation of various views is shown for a hypothetical app 100. The app 100 includes View A 104-1, View B 104-2, and View C 104-3 (collectively, views 104). In various implementations, the views 104 may be managed by one or more view controllers, which may be developed according to the model-view-controller (MVC) software architecture pattern.

In the example of FIG. 1, user action at A invokes View A 104-1. For example, View A 104-1 may be a default state and therefore invoking the app 100 will first lead to View A 104-1. User action at B transitions to View B 104-2. User action at C transitions to View C 104-3. User action at D transitions from View C 104-3 back to View B 104-2. View A 104-1 and View B 104-2 may be considered deep states, reachable via one or more user actions following invocation of the app 100.

As an example only, the app 100 may be a restaurant review app, where View A 104-1, the default state, is a search state with a text search box allowing a user to search for restaurants. View A 104-1 may also include canned queries, such as searches by specific cuisines and searches by specific locations. View B 104-2, displayed in response to the user performing a search in View A 104-1 (user activity at B), may be a search engine results page, displaying a list of restaurants meeting the search criteria as well as select information about each restaurant.

Upon user selection of one of the results in View B 104-2 (user action at C), View C 104-3 displays the information for the selected result. A view controller (not shown) may instantiate View C 104-3 from a template that includes user interface elements for displaying the name of the restaurant, representative pictures of the restaurant, and reviews of the restaurant, and user interface elements for performing actions, such as booking a table at the restaurant, writing a review, etc. The template may be populated with restaurant information from a data store for the selected restaurant. The user may return (user action at D) from View C 104-3 to View B 104-2 to select another result.

The app 100 may not include a mechanism for any internal request or external request (such as from a browser or from a search function of an operating system) to directly reach View B 104-2. In other words, deep links are not available to View B 104-2 or to View C 104-3. Further, even if the developer has implemented internal deep links to allow the app 100 to directly access View B 104-2 or View C 104-3, the app 100 may not have exposed this deep linking capability so that deep link instructions can be submitted to the app 100 from external sources.

SUMMARY

A mobile application development system includes a developer portal configured to receive a copy of a first application from a first developer and provide a routing library to the first developer for incorporation into the first application prior to the first developer distributing the first application via a digital distribution platform. The mobile application development system includes an offline analysis system configured to execute the first application and, during execution, monitor a sequence of user interface (UI) events initiated by an operator starting from an initial state and proceeding to a first state. The offline analysis system stores the sequence of UI events as a first data structure corresponding to the first state. The routing library includes instructions that, subsequent to installation of a copy of the first application in a user device, receive a link from an operating system of the user device identifying the first state and, based on the first data structure corresponding to the first state, replay, in order, each UI event from the sequence of UI events to the first application.

In other features, by incorporating the routing library, the first application is configured to register a first uniform resource identifier (URI) template with the operating system. In other features, the first URI template is a unique scheme including a text string ending with a colon and two forward slashes. In other features, the text string is a concatenation of a text identifier associated with the developer portal and a name of the first application.

In other features, the link selectively includes serialized data. The routing library includes instructions that decode the first data structure from the serialized data within the link. In other features, the first data structure is formatted as JSON (JavaScript Object Notation) encoded with Base64. In other features, the link selectively includes a unique identifier. The routing library includes instructions that retrieve the first data structure based on the unique identifier. In other features, the mobile application development system includes a data server configured to store the first data structure determined by the offline analysis system. The routing library includes instructions that query the data server using the unique identifier in response to the link. The data server responds to the query with the first data structure.

In other features, the mobile application development system includes a data server configured to store a plurality of data structures determined by the offline analysis system including the first data structure. The routing library includes instructions that, upon the first execution of the first application, download at least one of the plurality of data structures from the data server for storage in a data store local to the routing library. The routing library includes instructions that retrieve the first data structure from the data store in response to the unique identifier. In other features, the developer portal is configured to receive a debug build of the first application from the first developer.

A system includes the above mobile application development system and a search system configured to return results to the user device in response to a search commissioned by the user device. A first result of the returned results includes the link. In response to selection of the first result by a user of the user device, the link is transmitted to the routing library by the operating system.

A method of operating a mobile application development system includes receiving a copy of a first application from a first developer. The method includes providing a routing library to the first developer for incorporation into the first application prior to the first developer distributing the first application via a digital distribution platform. The method includes executing the first application on a processing system and, during execution, monitoring a sequence of user interface (UI) events initiated by an operator starting from an initial state and proceeding to a first state. The method includes storing the sequence of UI events as a first data structure corresponding to the first state. The routing library includes instructions that, subsequent to installation of a copy of the first application in a user device that is distinct from the mobile application development system, receive a link from an operating system of the user device identifying the first state and, based on the first data structure corresponding to the first state, replay, in order, each UI event from the sequence of UI events to the first application.

In other features, by incorporating the routing library, the first application is configured to register a first uniform resource identifier (URI) template with the operating system. The first URI template is a unique scheme includes a text string ending with a colon and two forward slashes. The text string is a concatenation of a text identifier associated with the mobile application development system and a name of the first application. In other features, the link selectively includes serialized data. The routing library includes instructions that decode the first data structure from the serialized data within the link. In other features, the link selectively includes a unique identifier. The routing library includes instructions that retrieve the first data structure from the mobile application development system based on the unique identifier.

In other features, the method includes storing the first data structure in a data store of the mobile application development system. The routing library includes instructions that, in response to the link, query the data server using the unique identifier. The method includes responding to the query by looking up the first data structure in the data store according to the unique identifier.

In other features, the method includes storing a plurality of data structures, including the first data structure, in a data store of the mobile application development system. The routing library includes instructions that, upon the first execution of the first application, download at least one of the plurality of data structures from the mobile application development system for storage in a data store local to the user device. The routing library includes instructions that retrieve the first data structure from the data store local to the user device in response to the unique identifier.

In other features, the receiving the copy of the first application includes receiving a debug build of the first application from the first developer for execution on the processing system. In other features, the method includes receiving a search commissioned by the user device, and identifying and returning results to the user device in response to the search. A first result of the identified results includes the link.

A non-transitory computer-readable medium stores instructions including receiving a copy of a first application from a first developer. The instructions include providing a routing library to the first developer for incorporation into the first application prior to the first developer distributing the first application via a digital distribution platform. The instructions include executing the first application on a processing system and, during execution, monitoring a sequence of user interface (UI) events initiated by an operator starting from an initial state and proceeding to a first state. The instructions include storing the sequence of UI events as a first data structure corresponding to the first state. The routing library includes instructions that, subsequent to installation of a copy of the first application in a user device that is distinct from the processing system, receive a link from an operating system of the user device identifying the first state and, based on the first data structure corresponding to the first state, replay, in order, each UI event from the sequence of UI events to the first application.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
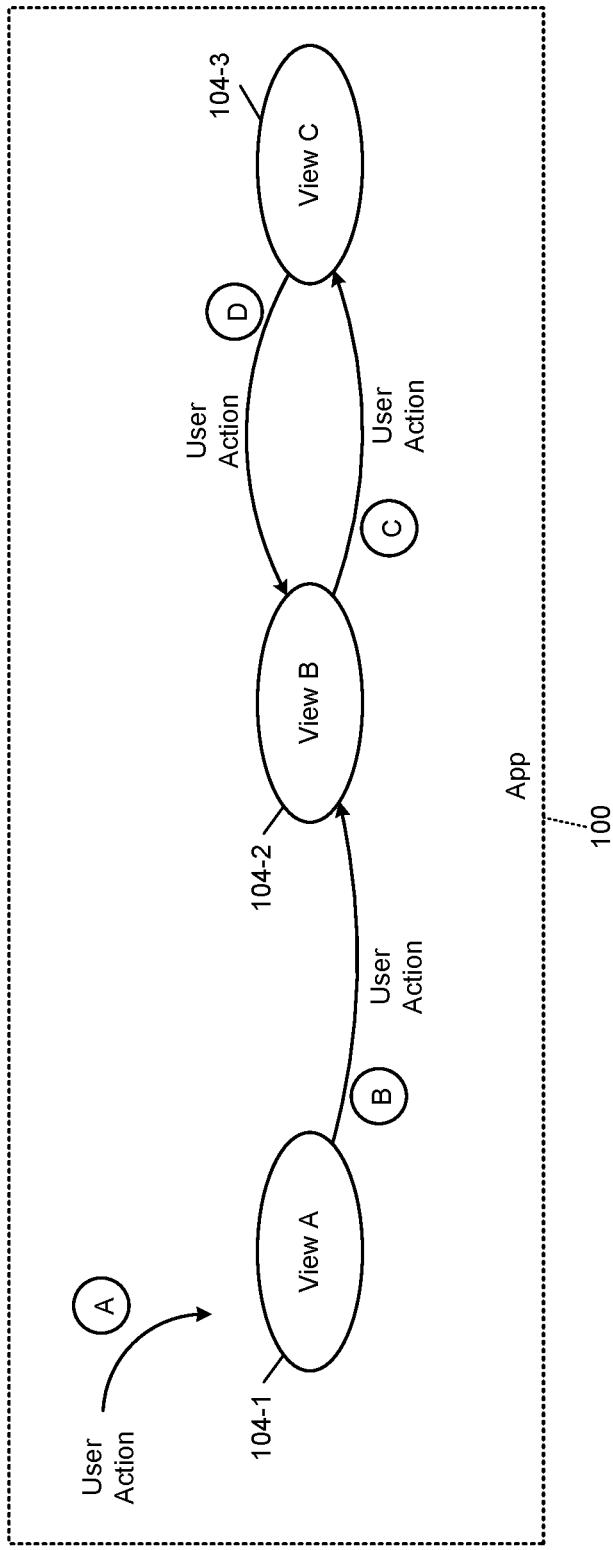
FIG. 1 is a graphical representation of user-initiated transitions between views in an example app.

For developers who have not had the time, resources, or expertise to implement deep link functionality for more than a subset of the states of their app, the present disclosure describes how the developer can augment their app with minimal effort. Specifically, a developer portal according to the principles of the present disclosure provides the app developer with a routing library for incorporation into the developer's app.

This routing library may be referred to as a dynamic link library (DLL), a dylib, or a software development kit (SDK). The routing library may be supplied to the developer's integrated development environment (IDE), such as Xcode. In some implementations, the developer simply has to associate the routing library with the app under development and needs to perform no other modification of the app or the app's code. In other implementations, the developer may also have to perform a step of modifying a configuration file, such as by adding a line corresponding to the routing library to an information property list (Info.plist) file for the app under development.

Meanwhile, the developer portal supplies the app to an offline analysis system that determines how to access states of interest. The states of interest may be specified by the app developer or determined by the developer portal. In brief, an offline analysis system of the developer portal determines what sequence of user interface (UI) actions a user would take to reach a state of interest. That UI action sequence can be replayed by the routing library within an app on a user's device to arrive at the state of interest. In other words, the routing library simulates the UI actions users would themselves perform to reach a deep state.

By simulating the UI actions, the routing library eliminates the need for the user to perform each UI action and will generally be far faster than a user manually performing the sequence of UI actions. The user may not even see some of the intermediate states when the routing library is navigating to the deep state of interest, or these intermediate states may only be visible briefly. However, some states having long or complicated UI sequences may require more time to reach using the routing library than if a user (particularly an experienced user) was navigating the app.

The UI action sequences for the deep states of an app may be integrated into the app along with the routing library, or may be downloaded by the routing library once the app is installed. In some implementations, a UI action sequence can be encoded as part of a link, or URI (uniform resource identifier), designating the app and serviced by the routing library.

Without further effort from the developer, the app now has deep link functionality that can be accessed from external sources. For example, a search system could provide results that lead directly to deep states of the app. Or a third party app could easily direct users to deep states of the app. This may increase the visibility of the app and allow for tighter integration and better overall user experience with the app.

In addition, now that the developer portal is responsible for deep linking, deep links can be added or modified without requiring assistance from the software programmers, who may be working on other projects and have other priorities. In other words, a business person, such as an advertising or marketing professional working for an app developer, may use the developer portal to identify which states of the app should be deep-linkable. The business person could even remove states from the list of deep-linked states, all without requiring the assistance of a software programmer.

Overview

Figure 2:
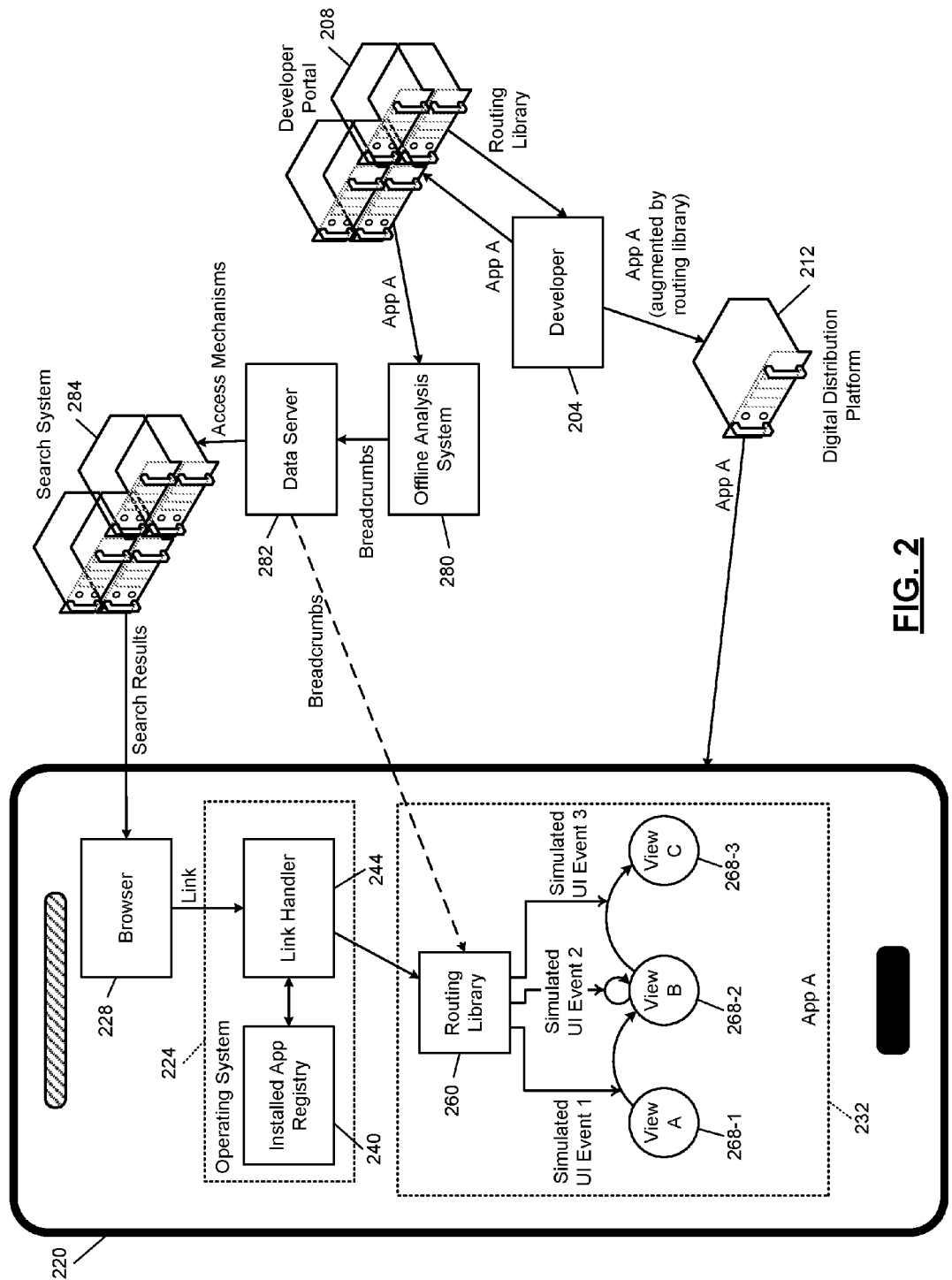
FIG. 2 is a high-level functional block diagram of a mobile application environment according to the principles of the present disclosure.

In FIG. 2, additional details are presented. As noted above, a developer 204 provides an app (referred to as "App A") to a developer portal 208. The developer portal 208 provides a copy of a routing library to the developer 204 for incorporation into App A, creating an augmented version of App A.

The developer 204 provides the augmented App A, which is still referred to as App A for simplicity, to a digital distribution platform 212 for distribution to end users. The digital distribution platform 212 provides native apps to user devices and may be specific to an operating system. Example digital distribution platforms include the GOOGLE PLAY digital distribution platform by Google, Inc., the APP STORE digital distribution platform by Apple, Inc., and the WINDOWS PHONE digital distribution platform by Microsoft Corp. If the developer 204 had already provided App A to the digital distribution platform 212 before augmentation with the routing library, the developer 204 can release the augmented App A as a new version of App A.

The user of a user device 220 installs App A from the digital distribution platform 212. In the user device 220, one or more processors (which may encompass general purpose processors as well as additional co-processors, such as physical sensor processors and graphics processors) execute instructions from memory.

Some of these instructions correspond to an operating system 224, a browser 228, and an installed copy 232 of App A (referred to as App A 232). The operating system 224 includes an installed app registry 240 and a link handler 244. The link handler 244 receives links, such as URLs (uniform resource locators) and URIs (uniform resource identifiers), and determines how to handle those links.

Generally, the link handler 244 handles a link by forwarding it to a registered receiver. The link handler 244 checks the installed app registry 240 to determine whether an app has claimed a particular scheme, domain, or other filter that matches the link. If not, the link may be passed to the browser 228, which may have registered a set of schemes for protocols such as HTTP (hypertext transfer protocol), HTTPS (HTTP secure), FTP (file transfer protocol), Telnet, and Gopher.

A routing library 260 causes App A 232 to register a specific scheme or domain with the installed app registry

240. The scheme may be based on an identifier of the developer portal 208 as well as an identifier of App A. For example, a test string associated with the developer portal 208 (such as "portal") may be concatenated with a text string corresponding to App A (such as "apps"). As a specific example, the scheme registered by App A 232 may be "portal-appa://". In other implementations, the text string associated with the developer portal 208 may not be human-readable.

When the link handler 244 receives a link, such as from the browser 228, where the scheme matches "portal-appa://", the link handler 244 forwards that link to App A 232, where the link is received and handled by the routing library 260. The routing library 260 parses the link and navigates to a deep state indicated by the link.

For illustration only, in FIG. 2, View A 268-1, View B 268-2, and View C 268-3 (collectively, views 268) are shown. In many apps, more than three views will be present. In various implementations, multiple or all views may be controlled by a single view controller. In other implementations, each view may be controlled by a separate view controller.

For illustration only, the routing library 260 is shown simulating events from a predetermined UI event sequence identified by an example link. The link is received by the routing library 260 and corresponds to a deep state, specifically View C 268-3. The UI event sequence includes a first UI event, causing App A 232 to transition from View A 268-1 to View B 268-2, a second UI event, in which App A remains in View B 268-2, and then a third UI event, causing App A 232 to transition from View B 268-2 to View C 268-3. The routing library 260 would simulate these UI events in series.

In parallel with providing the routing library from the developer portal 208 to the developer 204, the developer portal 208 provides App A to an offline analysis system 280. The copy of App A provided to the developer portal 208 may be a standard release build, such as an iOS App Store Package (ipa file).

In other implementations, the copy of App A provided to the developer portal 208 may be a special build that allows App A to be run in a simulator, and may include symbols, debugging info, and/or source code that would not ordinarily be present in an app distributed by the digital distribution platform 212. This may allow the offline analysis system 280 to more efficiently or accurately analyze App A. For example, the copy of App A may be a debug build designed to run in the Simulator application from Apple, Inc. on the OS X operating system. By contrast, the build of App A distributed by the digital distribution platform 212 is a standard release build.

The offline analysis system 280, as described in more detail below, determines UI event sequences that can be used by the routing library 260 to reach specific views of App A 232. A UI event sequence may be referred to as a breadcrumb trail composed of an ordered sequence of individual breadcrumbs (that is, UI events). For simplicity, in the remainder of this disclosure, the term breadcrumb will be used to refer to a breadcrumb trail.

The offline analysis system 280 may provide the determined breadcrumbs to a data server 282. The data server 282 includes a data store, such as a relational database, sorted map, or key-value store, that stores breadcrumbs for each app processed by the offline analysis system 280. Each deep state of an app is associated with a corresponding breadcrumb. In some implementations, the data server 282 may be implemented as a cloud-based block storage service, such as the S3 (Simple Storage Service) service available from Amazon Web Services.

Access mechanisms define how deep states can be reached for such purposes as display advertisements and deep search results. For example, a search result may correspond to a specific deep state of an app. The search result may be a deep view card (DVC, see below) with a link including or indicating a breadcrumb corresponding to that deep state. Other potential access mechanisms for the search result may include a native deep link prepared by the app developer itself, or a standard URL pointing to a web edition of the app.

One of the available access mechanisms may be selected by a search system and provided along with the search result to a search client. In other implementations, multiple access mechanisms may be provided within the search result, and the search client determines which access mechanism to use in response to user selection of the search result. For example, a breadcrumb-based access mechanism may be chosen over a web-based access mechanism when business rules indicate a preference for results to render in native apps instead of in web editions of those apps.

The breadcrumb-based access mechanism, however, may only be available when the app is already installed. In some implementations, the search client may incorporate, or receive as part of the search result, a script that downloads and installs of the app, and subsequently actuates a deep link. The deep link may be actuated by sending a breadcrumb-based URI to the newly-installed app.

A search system 284 receives access mechanisms from the data server 282 incorporating identifiers of breadcrumbs or the breadcrumbs themselves. The search system 284 may already have information about states of interest of App A and then can associate the access mechanisms with the respective states. In other implementations, the search system 284 may crawl and scrape App A to obtain metadata for states of interest, and may follow the access mechanisms to find the content of the states.

In one use model, the user of the user device 220 performs a search for certain functionality and/or for a certain entity, such as reviews for a restaurant of interest. The user may perform this search with a standalone search app or, as shown in FIG. 2, a web search performed via the browser 228. The search system 284, as described in more detail below, provides search results to the browser 228.

These results may include a result corresponding to App A 232, and may include a link indicating a specific deep state in App A 232. If the user selects the link corresponding to App A 232, the link is forwarded to the link handler 244 and then passed to the routing library 260 of App A 232. App A 232 is then controlled by the routing library 260 to display the indicated deep state using the corresponding breadcrumb.

In various implementations, the routing library 260 receives the contents of the breadcrumb from parameters encoded within the link itself. For example, the link (in this case, a URI) may include the scheme ("portal-appa://") followed by a serialized encoding of each UI event of the breadcrumb in series leading to the desired view. For example, the breadcrumb may be specified in a JSON (JavaScript Object Notation) data structure encoded using Base64.

The search system 284 is, therefore, able to provide a link that will take the user directly to relevant content within App A 232. The search system 284 may provide the search results to other apps. For example, a hotels app may query the search system 284 for restaurants near the user's selected hotel and the search system 284 may provide restaurant search results to the hotels app. In the case where App A 232 is a restaurant review app, the hotels app can link directly into a deep state of App A 232 corresponding to the restaurant of interest. The search system 284 may provide the search results in the form of DVCs.

A DVC for an app or a state of an app shows additional information beyond just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment.

Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances the DVC itself may provide the necessary information to accomplish such action.

In various implementations, the routing library may be identical for each app with the only exception being the name of the custom scheme that the routing library will register upon installation. The scheme may be formed by concatenating text of the developer portal with the text of the app name, and may include a separator such as a hyphen or an underscore. The name of the app may change over time, but the scheme may be fixed after first being set to provide backward compatibility with older versions of the app whose routing library may only recognize the original scheme.

In various implementations, the routing library may be updated with security updates, bug fixes, and feature additions while maintaining backward compatibility. Developers, such as the developer 204, may download and incorporate the newest version of the routing library each time they release a new version of their app to the digital distribution platform 212. In some implementations, the build/compile process may automatically download the latest version of the routing library when resolving linker dependencies.

The offline analysis system 280 may need to be invoked each time the developer 204 prepares a new version of App A for the digital distribution platform 212. In addition, as the developer 204 adds more content to App A, the offline analysis system 280 may be invoked to determine the breadcrumbs needed to access that added content. Invocation of the offline analysis system 280 may be performed at the request of the developer 204 or may be performed on a periodic basis. Any updates or additions to the breadcrumbs are stored by the data server 282 and can be provided to the search system 284 so that links within search results have the most up-to-date access mechanisms.

In some implementations, the breadcrumbs may be communicated to the routing library 260 using a mechanism other than direct inclusion in the URI. For example, this may be necessary when a maximum-length link is shorter than the number of characters an encoded breadcrumb may require.

The routing library 260 may, therefore, in some implementations, download a package of breadcrumbs from the data server 282. Search results from the search system 284 or other links may then reference a unique identifier, which the routing library 260 maps to a breadcrumb. For example only, the unique identifier may be formed from a function and an entity, such as "restaurant_reviews" and "Amarin_Thai". In one specific example, the URI "portal-appa://restaurant_reviews/Amarin_Thai" may be resolved by the routing library 260 to a breadcrumb that reaches the restaurant review state for the Amarin Thai restaurant from a default state of App A 232. However, there is no requirement that the unique identifier be human-readable.

In other implementations, the routing library 260 may consult the data server 282 in response to receiving a deep link. By providing the unique identifier, the routing library 260 can download the necessary breadcrumb from the data server 282. In such implementations, the routing library 260 may cache breadcrumbs so that a network access isn't required to resolve deep links visited recently. Pre-caching of some or all breadcrumbs may also be performed, such as when App A 232 first executes on the user device 220.

Pre-caching may happen even earlier, such as when the developer 204 is preparing App A for distribution. In other words, the full set or a subset of the breadcrumbs may be included along with App A so that when a unique identifier is received via a link, the appropriate breadcrumb can be chosen by the routing library 260 without delay. Pre-caching may be combined with periodic verification of the breadcrumbs by the routing library 260, such as by checking a version number of the package of breadcrumbs at a periodic calendar interval, such as once a month. In other implementations, the data server 282 may send a push notification to the routing library 260 indicating that new breadcrumbs are available.

To the extent that the developer 204 had implemented some deep links within App A, a developer-implemented router (not shown) in App A 232 would receive links from the link handler 244. The developer's routing code would not have registered "portal-appa://" but instead a scheme independent of the developer portal 208, such as "appa.com://". In various implementations, the developer-specified URIs may not be publicly available or may only be available to companies with an established relationship to the developer 204.

Some operating systems, including the iOS operating system, have a sandbox infrastructure to limit the extent to which an app can access resources or areas of memory beyond what has been specifically allocated to the app. Sandboxing enhances security, making it more difficult for malicious software to compromise a user system. Because the routing library 260 executes within the context of App A 232, the sandbox should pose no difficulty for interactions between the routing library 260 and the user interface elements of App A 232.

Routing Library

Figure 3A:
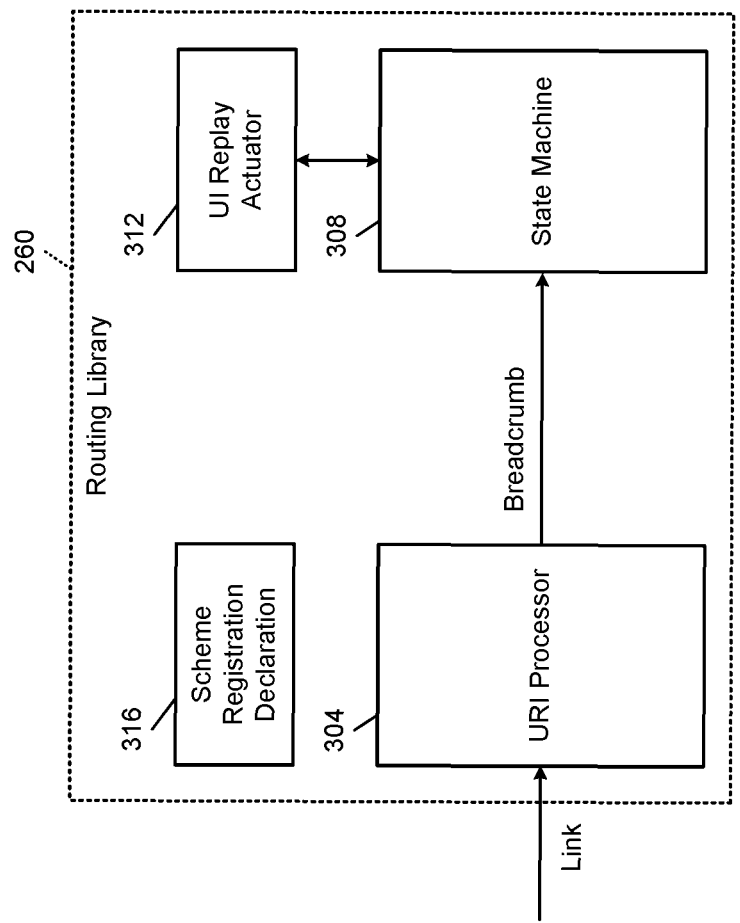
FIG. 3A is a functional block diagram of an example implementation of a routing library.

In FIG. 3A, an example implementation of the routing library 260 includes a URI processor 304, which receives a link, such as from the link handler 244 in FIG. 2. The URI processor 304 may hook into an operating system method to check whether the app was launched as a result of an external request for deep link access. For example, within the iOS environment, this method may be "application:didFinishLaunchingWithOptions:". In various implementations, the URI processor 304 may hook the objc_msgSend C function to see calls to all classes and their methods. Then, calls to the "application:didFinishLaunchingWithOptions:" method can be identified and processed.

If the application was launched in response to a deep link request, the URI processor 304 extracts a breadcrumb from the received link and provides the breadcrumb to a state machine 308. Otherwise, the URI processor 304 may remain dormant and pass control back to a default handler within the app for the "application:didFinishLaunchingWithOptions:" method. Hooking into a method may be performed using method swizzling. In various implementations, a data structure encoded in the link may include additional information beyond the breadcrumb. For example, the data structure may include configuration parameters instructing the state machine 308 to hook certain methods to test for responses to UI events.

The test for whether the application launch resulted from a deep link that the routing library 260 should process may be accomplished using the following pseudocode, which tests whether the registered scheme (again, using the hypothetical "portal-appa://" scheme) matches the scheme of a received link. The NSLog debugging command is a placeholder for the code that handles the identified deep link.

```
NSURL * deeplink = launchOptions[UIApplicationLaunchOptionsURLKey];
if (deeplink) {
    NSString * host = [deeplink host];
    NSString * path = [deeplink lastPathComponent];
    if ([host isEqualToString:@"portal-appa"] &&
    [path length] != 0) {
        NSLog(@"Portal: DEEPLINK");
    }
}
```

The URI processor 304 may also hook into another method within the iOS environment known as "viewDidAppear:" involved with view-related notifications. In various implementations, a deep link may result in either the "viewDidAppear:" or the "application:didFinishLaunchingWithOptions:" methods being called, depending on an operating mode of the app, and therefore the URI processor 304 hooks to both. In the iOS environment, views can transition between Appearing, Appeared, Disappearing, and Disappeared. The "viewDidAppear:" method is associated with a view transitioning from the Appearing state to the Appeared state.

The state machine 308 replays each UI event from the breadcrumb in series using a UI replay actuator 312. UI events may include simulations of taps, presses, keyboard entry, and gestures. These events may accomplish UI actions such as pressing buttons, filling in text fields, selecting icons, and making menu selections.

In some implementations, the UI replay actuator 312 may be implemented using built-in accessibility functionality (which may be referred to as an accessibility framework) from the operating system. For example, an app developer typically develops an app for the iOS operating system from Apple, Inc. using the Apple-supplied Xcode programming tools. Included in those tools is a utility called the UIAutomation framework that developers can use to simulate user interaction with the app as part of the app development process.

However, the UIAutomation framework is a private framework (used only during development) and may be prohibited from incorporation into the app as delivered to the end user. Unless the UIAutomation framework becomes available for normally-distributed apps, the UI replay actuator 312 may be implemented with custom software.

The UI replay actuator 312 may use the iOS sendActionsForControlEvents: method of the UIControl class to send interface manipulation events (e.g., tap, press, click) to designated UI elements. To direct these interface manipulation events to the proper UI element, unique identifiers for the UI elements may be determined by the offline analysis system 280, as described in more detail below.

The offline analysis system 280 extracts or scrapes the text value associated with each element and uses that text value (e.g., text string) as the unique identifier. Typically the text value of each UI element will be text contained within a displayed menu item or list item. As an alternative to using a text value, an ordinal number associated with the UI element may also be used. In some instances, where text values alone do not represent unique identifiers, the offline analysis system 280 may combine (such as by concatenation) the extracted or scraped text with the extracted ordinal number to thereby generate a unique identifier.

The breadcrumb includes an ordered series of UI events, each including a unique identifier indicating the UI element to be actuated. The state machine 308 sends each UI event to the UI replay actuator 312 in order. The UI replay actuator 312 may use the sendActionsForControlEvents: method to send an event, such as a simulation of a tap, to a UI element indicated by the unique identifier.

In some implementations, the state machine 308 waits for a predetermined period of time between each UI event. In other implementations, the state machine 308 waits for an indication from the UI replay actuator 312 that the host app is ready to receive additional input. For some UI events, the host app may be ready to receive additional input immediately while for other UI events, such as when a UI event results in a new view being loaded and displayed, there may be a delay until the host app is once again ready to receive a UI event.

In various implementations, the state machine 308 may also verify that the correct view is present after each UI event. If the expected view is not displayed, the state machine 308 may wait for an additional timeout. If the expected view is still not displayed, the state machine 308 may abort the UI replay to avoid sending UI events to the wrong view and potentially placing the host app in an unknown state.

After aborting the UI replay, the state machine 308 may revert the host app to a default state and attempt to traverse the breadcrumb an additional time. If the second attempt also fails to traverse the views of the host app as expected, the state machine 308 may return to the default state of the host app and display an error message indicating the inability to reach the linked deep state.

A scheme registration declaration 316 identifies the scheme, such as "portal-appa://," to be registered by the routing library 260. In various implementations, the scheme registration declaration 316 is located in a configuration file of the app, such as Info.plist.

Figure 3B:
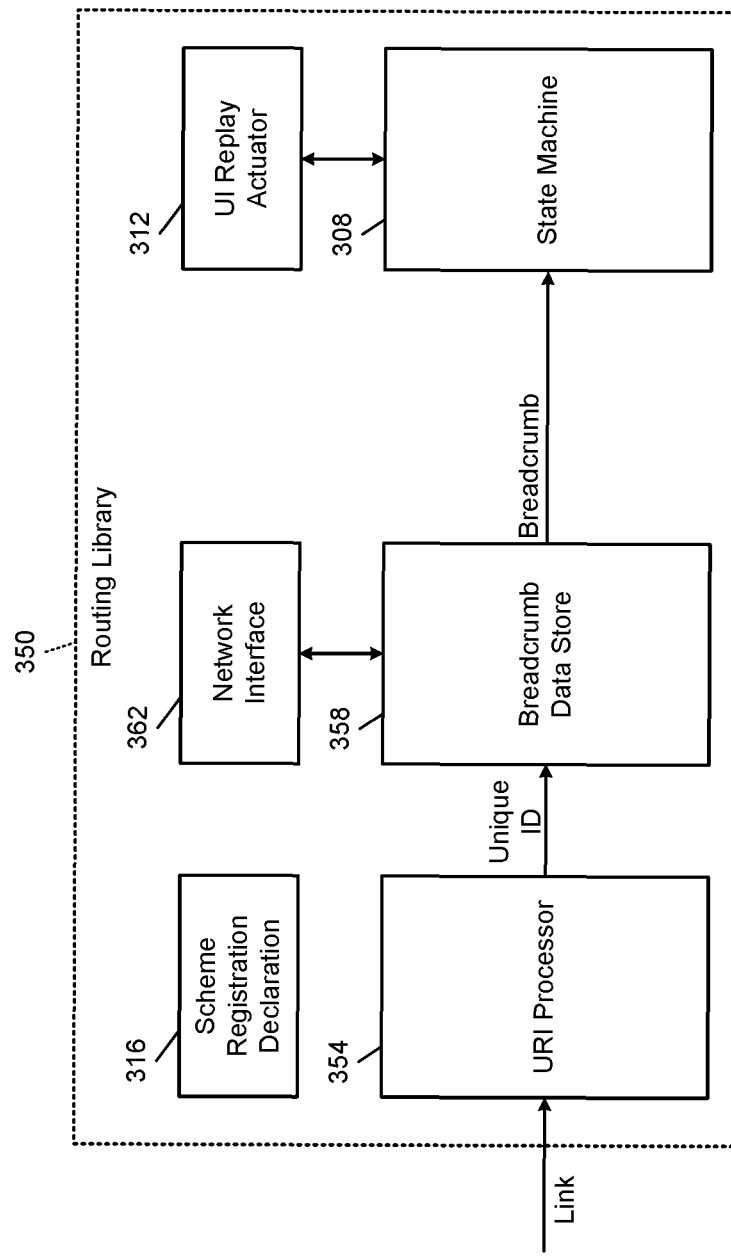
FIG. 3B is a functional block diagram of another example implementation of a routing library.

In FIG. 3B, a routing library 350 includes elements similar to or identical to the scheme registration declaration 316, the UI replay actuator 312, and the state machine 308 of FIG. 3A. In the routing library 350, a URI processor 354 receives a link, such as from an operating system of a user device in which the routing library 350 is installed. The link may be a URI that conforms to the scheme specified in the scheme registration declaration 316.

The URI processor 354 extracts a unique ID from the link, which may be performed simply by taking the text of the URI to the right of the pair of forward slashes in the URI. The unique ID is used to index a breadcrumb data store 358. The breadcrumb data store 358 stores, for each unique ID, a breadcrumb including a series of UI events to replay to reach a corresponding state of an app.

If the breadcrumb data store 358 does not include a breadcrumb for the unique ID, the breadcrumb data store 358 may access a source of breadcrumbs, such as the data server 282 of FIG. 2, via a network interface 362.

In some implementations, the breadcrumb data store 358 retrieves a complete package of all available breadcrumbs via the network interface 362 when the app incorporating the routing library 350 is first executed on a user device. In some implementations, each time the app incorporating the routing library 350 is started, the breadcrumb data store 358 may query the data server 282 to retrieve new and updated breadcrumbs.

Dynamic Analysis

Figure 4:
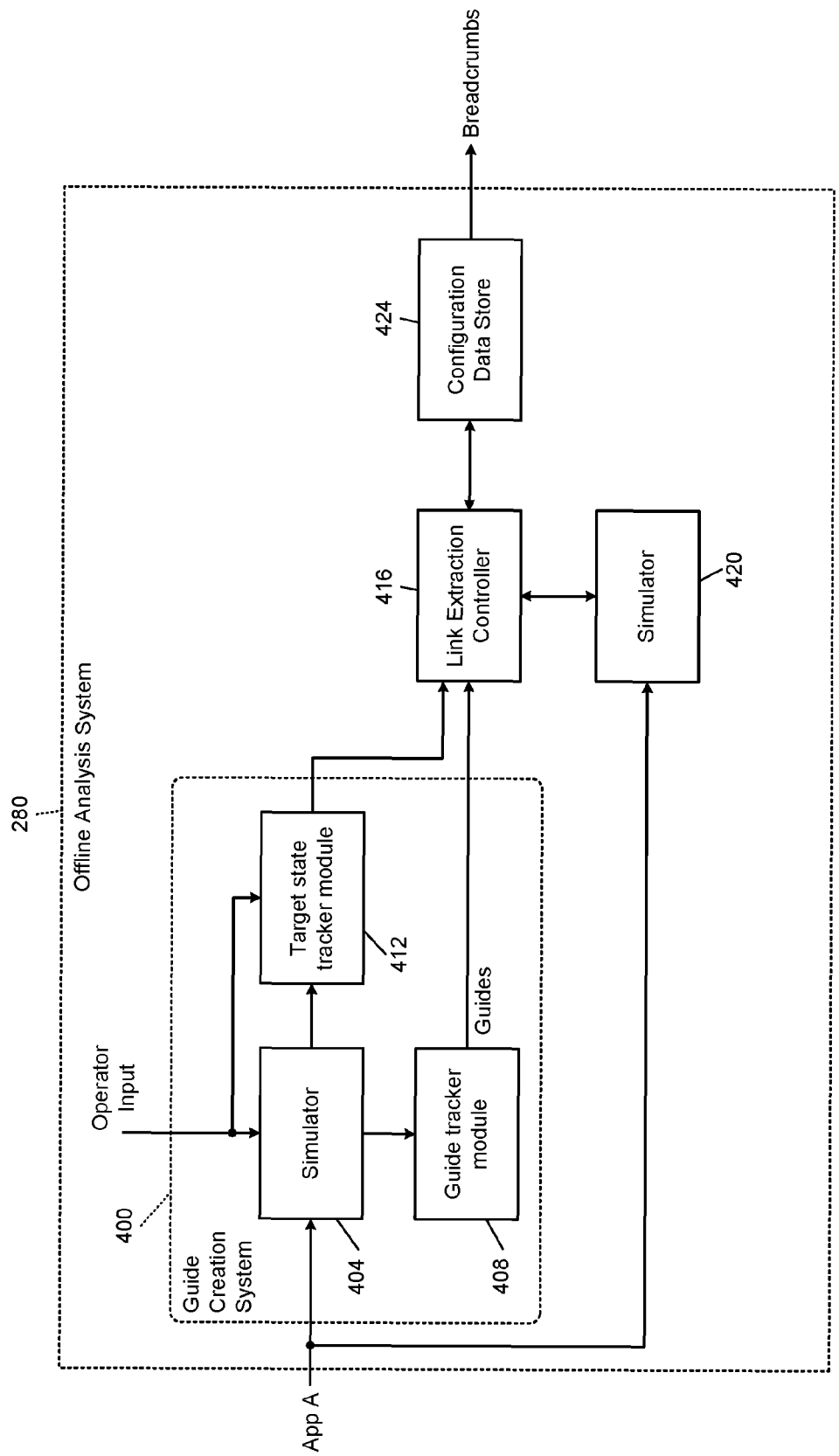
FIG. 4 is a functional block diagram of an example implementation of an offline analysis system.

In FIG. 4, an example implementation of the offline analysis system 280 includes a guide creation system 400 that allows for operator interaction with an app of interest (such as App A). The guide creation system 400 allows an operator to specify which states of an app should be deep-linkable and may use input from the operator to determine how to reach those deep states. In various implementations, the operator is an administrator of the offline analysis system 280, acting on standard operating procedures for offline processing of an app or on instructions from a developer of the app. Additionally or alternatively, an agent of the app developer may act as the operator. The agent may specify which states or types of states should be made accessible as deep states.

After the initial offline analysis, the agent may use the developer portal 208 to request that additional states of the app be added as deep states and request that existing deep-linked states be removed. This may be done via the developer portal 208 with no need for the agent to modify the code of the app or even request assistance from the app's software developers. In other words, marketing personnel or user experience designers may themselves control the scope of the deep linking within the app, without even releasing a new version of the app. For added states, the offline analysis system 280 will re-process the app to determine the breadcrumbs to the added states.

For an app being processed by the offline analysis system 280, the operator controls a copy of the app of interest executing within a simulator 404. In various other implementations, the app of interest may be installed on a physical device or executed in an emulation environment. In various implementations, the simulator 404 may be instantiated at a cloud hosting operator that may provide compute facilities within which to execute emulator/simulator code, or that may directly provide emulators or simulators for one or more mobile device operating systems. For more information, see U.S. patent application Ser. No. 14/868,294, filed Sep. 28, 2015, titled "Operator-Guided Application Crawling Architecture," with first-named inventor Kalyan Desineni. The entire disclosure of this application is incorporated by reference.

In some implementations, a physical device running the operating system may be used instead of the simulator 404, such as for an operating system that does not have a suitable simulator or emulator. The physical device may be connected to the guide creation system 400 using a wireless or wired interface, such as USB (universal serial bus). A root-level control application may be installed on the physical device to track user input. Installing the root-level application may require bypassing security limitations of the firmware or operating system regarding privileges of installed apps and may require that the device be jailbroken. Jailbreaking involves bypassing or removing various software restrictions imposed by the operating system and/or device firmware, and may be accomplished using a privilege escalation technique. In some implementations, special tools may be installed on a jailbroken phone, such as Cydia package manager tools from SaurikIT.

The operator's interaction with the app may be recorded to form a guide indicating how a state is reached. This guide defines the breadcrumb used to reach the end state, and subsets of the guide define the breadcrumbs for intermediate states. The guide may also be used to infer other states of interest and determine breadcrumbs leading to those states. Each UI event may be associated with a specific UI element, identified according to a predetermined rubric by a unique ID.

For example, the unique ID may be dictated by how the UI elements are programmatically created when rendering the view. In other implementations, the unique ID may be dictated by how the UI elements are actually seen, with the UI elements numbered in increasing order from left to right and top to bottom. In other implementations, x-y coordinates may be used to identify the location of the user interaction, or the boundaries of the UI element actuated, or a center of the UI element actuated even if the operator's action was off-center.

In various implementations, static analysis may be used to analyze the UI elements of various states of the app. Static analysis involves analyzing the code of the app without making observations of the app being executed. Before static analysis is performed, the application package (such as an IPA file) is downloaded, decrypted, and disassembled. The disassembly may be performed on a higher-performance machine than the static analysis or dynamic analysis itself.

In some implementations, a static analyzer (not shown) may identify the UI elements of each view and assign unique identifiers to each UI element within a view. Then, dynamic analysis would have a predetermined nomenclature when referring to user interactions with any UI elements.

Additionally or alternatively, the static analyzer may analyze the methods and views of an app to determine how to best instrument the app. With this information, the dynamic analyzer can hook to the correct methods and listen for the correct events to accurately track user interaction with the app and discard method calls unrelated to user interaction. For more information on static analysis, see U.S. patent application Ser. No. 14/843,929, filed Sep. 2, 2015, titled "Static Analysis-Assisted Dynamic Application Crawling Architecture," with first-named inventor Kalyan Desineni. The entire disclosure of this application is incorporated by reference.

While the app is running in the simulator 404, the guide creation system 400 may monitor the messaging queue of the simulator 404 (or of the actual operating system when executing in an emulator or physical device), and listen for messages indicative of user manipulation of the app. Such manipulation includes, for example, clicking, pressing, pinching, or swiping of the user interface.

In addition to capturing a unique identifier for each UI element the operator interacts with, the guide creation system 400 may also extract the type of each element according to the defined types specified by the operating system, and further extract the identity of the associated view controller.

For example, the following methods may be hooked, such as by using method swizzling:
- (void)sendEvent:(UIEvent *)event method in the UIApplication class
- (void)sendAction:(SEL)action to:(id)target forEvent:(UIEvent *)event in UIControl class
- (void)viewDidAppear:(BOOL)animated for all the controllers that were loaded A handler may be implemented to record each type of UI element. As an example, code for recording a button press can be implemented as follows:

```
-(void)sendEvent:(UIEvent *)event
{
    for (UITouch *touch in event.allTouches)
    {
        if (touch.phase == UITouchPhaseBegan)
        {
            if ([touch.view isKindOfClass:[UIButton class]]) {
                NSLog(@"UIButton:id:{%@}",
                [((UIButton *)touch.view) currentTitle]);
            }
        }
    }
}
```

Other types of UI elements may be recorded by similar handler code. In various implementations, after hooking the objc_msgSend function, a guide tracker module 408 may listen to the AppDelegate class and the (BOOL) application: (id)application ~didFinishLaunchingWith Options: ~(NSDictionary *)launchOptions method. Further, the guide tracker module 408 may dynamically create listeners for controllers.

Instead of trying to exhaustively discover every state of an app through an unguided crawl of the app, the operator can help focus the analysis on the states for which deep links are desired—generally, the most interesting or important states. The operator may begin at a home state of the app and progress to one state of interest for each category of states for which deep linking is desired. The offline analysis system 280 may then extrapolate to find similar/parallel actions, each of which may correspond to another state of interest. These parallel states can be added to a state list that defines which states will have corresponding breadcrumbs stored.

For example, if the app includes information about restaurants, the operator may browse to a state that lists restaurants, and then select one of the restaurants. The operator may stop after finding a state that shows details about a first restaurant. Based on the series of actions taken by the operator during browsing, the offline analysis system 280 can find other restaurant detail states that could have been reached in a similar way.

For example, after selecting a restaurant item with a certain layout and certain properties (e.g. an image with property X next to a text box with property Y) from a list, the offline analysis system 280 may detect multiple additional restaurant items (that have the same layout and/or properties) within that view, which the operator could have selected. It may then predict that selecting the other restaurant listings will result in finding additional restaurant info states. For additional information about extrapolation, see U.S. patent application Ser. No. 14/869,127, filed Sep. 29, 2015, titled "State Extrapolation for Automated and Semi-Automated Crawling Architecture," with first-named inventor Kalyan Desineni. The entire disclosure of which is incorporated by reference.

Within the guide creation system 400, a guide tracker module 408 records operator interaction with the app in the simulator 404 to create operator-specified guides. For example, a guide may include each user interface interaction performed by the operator, beginning at the home (or, default) state of the app. In various implementations, a target state tracker 412 may allow the operator to flag a state currently visible in the simulator 404 as a state of interest. For example, the target state tracker 412 may provide a user interface element (such as a button) within the simulator 404 or as part of software through which the operator controls the simulator 404.

For each state of interest, a link extraction controller 416 generates a breadcrumb specifying a sequence of UI events that leads to the state of interest. The link extraction controller 416 is aware of states that are of interest to the operator, either explicitly (such as via the target state tracker 412) or implicitly (such as via the guide tracker module 408). The link extraction controller 416 may attempt to identify similar states—for example, states that are reached using similar UI (user interface) elements.

Target states may be explicitly identified by the operator using the target state tracker 412. If target states are not specified by the operator, the link extraction controller 416 may assume that the final state reached when an operator is creating a guide is the target state. Alternatively, the link extraction controller 416 may make the assumption that every state the operator navigated to should be a target state. A deduplication procedure may be used to detect when the operator has browsed in a loop, thus avoiding recording duplicative and/or non-shortest-path guides. Deduplication may be less necessary if the operator is explicitly marking target states.

The link extraction controller 416 operates a simulator 420, which, as described above, could instead be an emulator or a physical device. For scale, multiple emulators, simulators, and/or physical devices may be controlled by the link extraction controller 416 to analyze the same or different applications. As an example only, a bank of physical smartphones may all be connected via USB to an interface card that is controlled by the link extraction controller 416. Simply for ease of illustration, only a single simulator (the simulator 420) is shown in FIG. 4. In various implementations, the simulator 420 and the simulator 404 may be a single simulator shared by the guide creation system 400 and the link extraction controller 416.

The application of interest is executed within the simulator 420. In various implementations, the app executed by the simulator 420 may be supplemented with a routing library, such as is described in FIG. 3A or FIG. 3B. With the routing library, the link extraction controller 416 can cause the app in the simulator 420 to replay UI events to follow guides and identify additional states of interest. In other implementations, because the app in the simulator 420 does not need to be a publicly-distributed version of the app, an accessibility or automation framework may be used to perform UI control. The routing library may be reserved for the version of the app that is publicly distributed.

The link extraction controller 416 identifies states of interest corresponding to each of the guides specified by the guide tracker module 408. In order to reach a state within the app, the link extraction controller 416 sends the shortest path specified by the guide tracker module 408 to the simulator 420 to be replayed. The link extraction controller 416 identifies states of interest corresponding to each of the guides specified by the guide tracker module 408.

In various implementations, the offline analysis system 280 may include a scraper (not shown) that extracts content from each state of interest. The content may include text, images, and metadata, such as location, formatting, interface hints, etc. This content may be used by the search system 284 of FIG. 2 to determine which deep states of the app are relevant to a search query. In other implementations, the search system 284 may crawl and scrape the app separately, but may use the breadcrumbs from the offline analysis system 280 to navigate to the various states.

If there are UI fields into which text needs to be entered, the operator may identify to the guide creation system 400 what types of textual input need to be entered. The types could be, for example, city names, cuisine names, etc. The link extraction controller 416 then consults a knowledge base to get a list of possible values of such types (for cities, the list might include "Seattle," "San Jose," etc.) and then replays each one of these values into the textual input field.

The link extraction controller 416 may detect that a potential state of interest has already been reached by following a different breadcrumb. The link extraction controller 416 may then select one of the breadcrumbs to associate with that state. For example, the breadcrumb having the fewest number of UI events may be selected. Alternatively, the breadcrumb having the fewest view changes may be selected, and the total number of UI events may be used as a tiebreaker.

To identify that a state has already been reached, the link extraction controller 416 may store a fingerprint for each state along with the breadcrumb. The fingerprint may be a reduced representation of the components of a state. For example, a representation of visible objects may be created, such as by enumerating the objects in an XML data structure and then computing a mathematical hash (such as with MD5) of the data structure. The hash is then the fingerprint, and if the hash of a new state matches a hash of an existing state, the states are considered to be the same.

As the link extraction controller 416 assembles the set of states of interest, the link extraction controller 416 may store an identifier of the state into a configuration data store 424. For each state of interest, the link extraction controller 416 determines a breadcrumb to reach that state and stores the breadcrumb in the configuration data store 424. In addition, content or a fingerprint from states is stored in the configuration data store 424. Data from the configuration data store 424 may be provided to the search system 284 of FIG. 2.

Overall Operation

Figure 5:
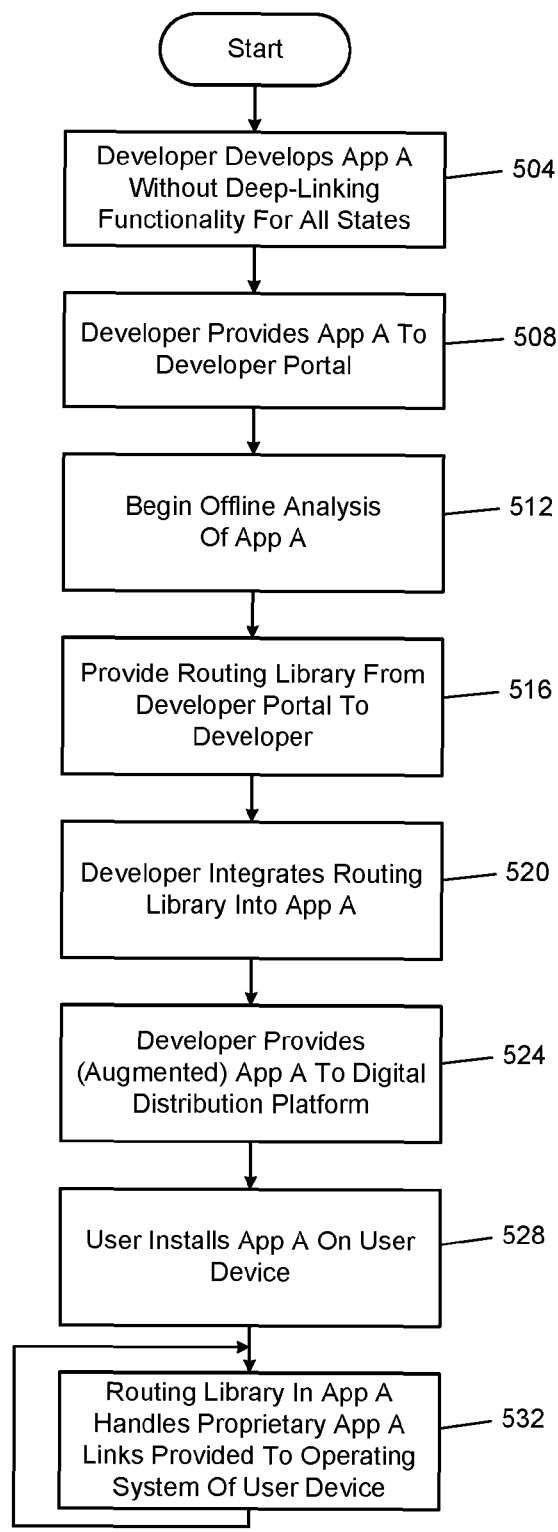
FIG. 5 is a flowchart of example overall operation of a mobile application ecosystem according to the principles of the present disclosure.

In FIG. 5, an overview of the operation of the present disclosure begins at 504. A developer develops an app ("App A") but does not implement deep linking functionality for all states and maybe does not implement deep linking functionality for any states. At 508, perhaps even years later, the developer determines that deep linking functionality may be valuable to users of App A as well as may increase the visibility of App A, so the developer provides App A to a developer portal. At 512, control begins offline analysis of App A.

At 516, the developer portal provides a routing library to the developer. At 520, the developer integrates the routing library into App A. This integration may be as simple as adding the routing library to the integrated development environment by importing a header file and an object file. At 524, the developer provides App A, as augmented with the routing library, to a digital distribution platform.

At 528, a user installs App A on a user device, causing proprietary App A links to be registered with the user device. At 532, the routing library within App A handles proprietary App A links that are provided by the operating system of the user device. For example, these links may come from a browser, a search app, or another app that is aware of deep linking. The routing library determines the breadcrumb specified by the link and replays UI events from the breadcrumb in order to reach the specified state. Control remains at 532 for this installation of App A, where the routing library in App A continues to handle proprietary App A links until the application is uninstalled from the user device.

Server-Side Control

Figure 6:
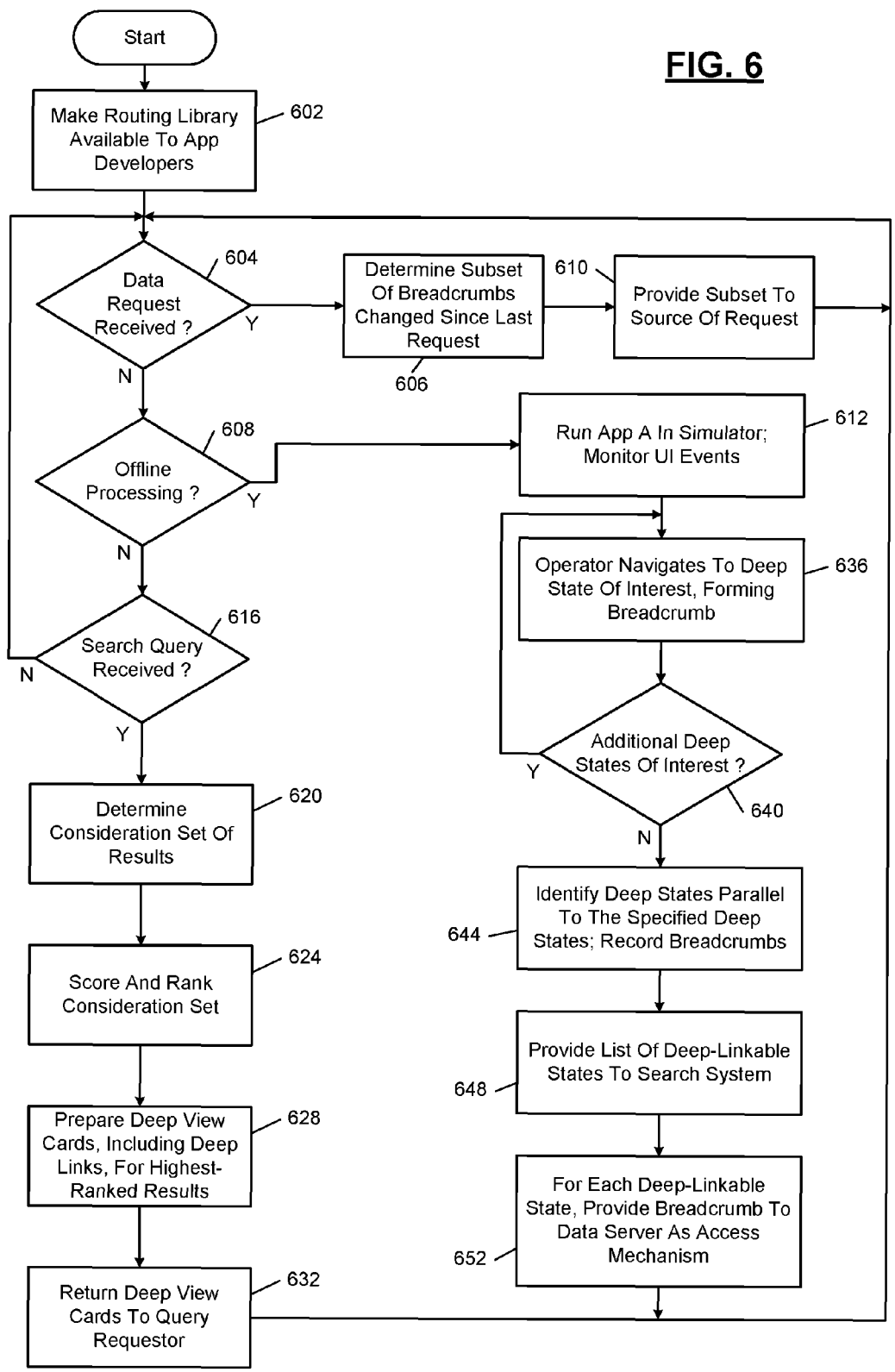
FIG. 6 is a flowchart of example operation of deep link creation and provision to user devices according to the principles of the present disclosure.

In FIG. 6, the operation of server-side components may be performed by a single device or may be performed across the developer portal 208, the offline analysis system 280, the data server 282, and the search system 284 of FIG. 2. In various implementations, the developer portal 208, the data server 282, and the search system 284 may be under the control of the same entity. The offline analysis system 280 may employ operators that facilitate static analysis and/or dynamic analysis to ensure that accurate and complete parameters are extracted from each app.

Control begins at 602, where the routing library is made available to app developers. Over time, the routing library may be updated, and the most up-to-date version may be the only one available to app developers. At 604, if a request for a breadcrumb has been received, control transfers to 606; otherwise, control transfers to 608. At 606, control determines a subset of the breadcrumbs that has changed since the last request was received from the requestor. This subset can then be provided at 610 to bring the data up-to-date at the source of the request. Control then returns to 604.

At 608, if offline processing of an app has been initiated, control transfers to 612; otherwise, control transfers to 616. At 616, if a search query has been received from a search system, control transfers to 620; otherwise, control returns to 604. At 620, control determines a consideration set of results corresponding to the search query. This consideration set may include apps that are open to the search query as well as specific states (deep states) of apps that are relevant to the search query.

At 624, control scores the elements in the consideration set based on how closely they match the understood intent of the search query. The scored results can then be ranked from most relevant to least relevant. At 628, the highest-ranked results are formatted as deep view cards associated with deep links to the specific states within the results. At 632, control returns the deep view cards to the requestor of the query.

The deep view cards may not be fully rendered, and instead include images, text, and instructions on how to render the deep view cards for particular screen sizes, orientations, and other requirements of the requesting application or operating system. For apps where the deep links are serviced by a routing library according to the principles of the present disclosure, an access mechanism returned along with the corresponding search result may include a URI with an encoded data structure.

The encoded data structure may include the breadcrumb necessary to invoke that specific state from within the app. The URI, being a string, includes a serialized version of that data structure and is prefixed with a scheme. The scheme, such as "portal-appa://", will cause the URI to be forwarded to and recognized by the routing library of the app. Control then returns to 604.

At 612, control runs App A, such as in a simulator. While App A is running, control monitors UI events resulting from the operator's usage of App A. At 636, control allows an operator to interact with App A to reach a deep state of interest, recording each UI interaction to form a breadcrumb. In various implementations, control may monitor how long it takes App A to respond to certain UI events. These response times, or delays based on the response times, may be encoded in the breadcrumb along with the corresponding UI events. For example, some operations may require App A to obtain data from a server, incurring network communication delays. When replaying the UI events in the breadcrumb, there should be a longer delay after the UI event leading to network access before the next UI event is replayed. At 640, if there are additional deep states of interest, control returns to 636; otherwise, control continues at 644.

At 644, control determines states that are parallel to the states identified by the operator. For example, if the operator selects a link from a list of similar-looking items, and the selected link leads to a state of interest, control may assume that the other items in the list are also of interest. These parallel states, and the breadcrumbs used to reach them (in the list example, the breadcrumbs would differ only in the last UI event), are added to the list of deep-linkable states.

In various implementations, App A may be exercised using a crawling algorithm to reach some or all deep states of App A. For additional information regarding crawling, see U.S. patent application Ser. No. 14/849,540, filed Sep. 9, 2015, and titled "Unguided Application Crawling Architecture," with first-named inventor Kalyan Desineni. The entire disclosure of this application is incorporated by reference.

At 648, control provides a list of deep-linkable states to a search system for indexing. At 652, for each deep-linkable state, control provides a data structure containing the breadcrumb to the data server to be used in a URI as an access mechanism to access the deep state. Control then returns to 604.

Breadcrumb Creation

Figure 7:
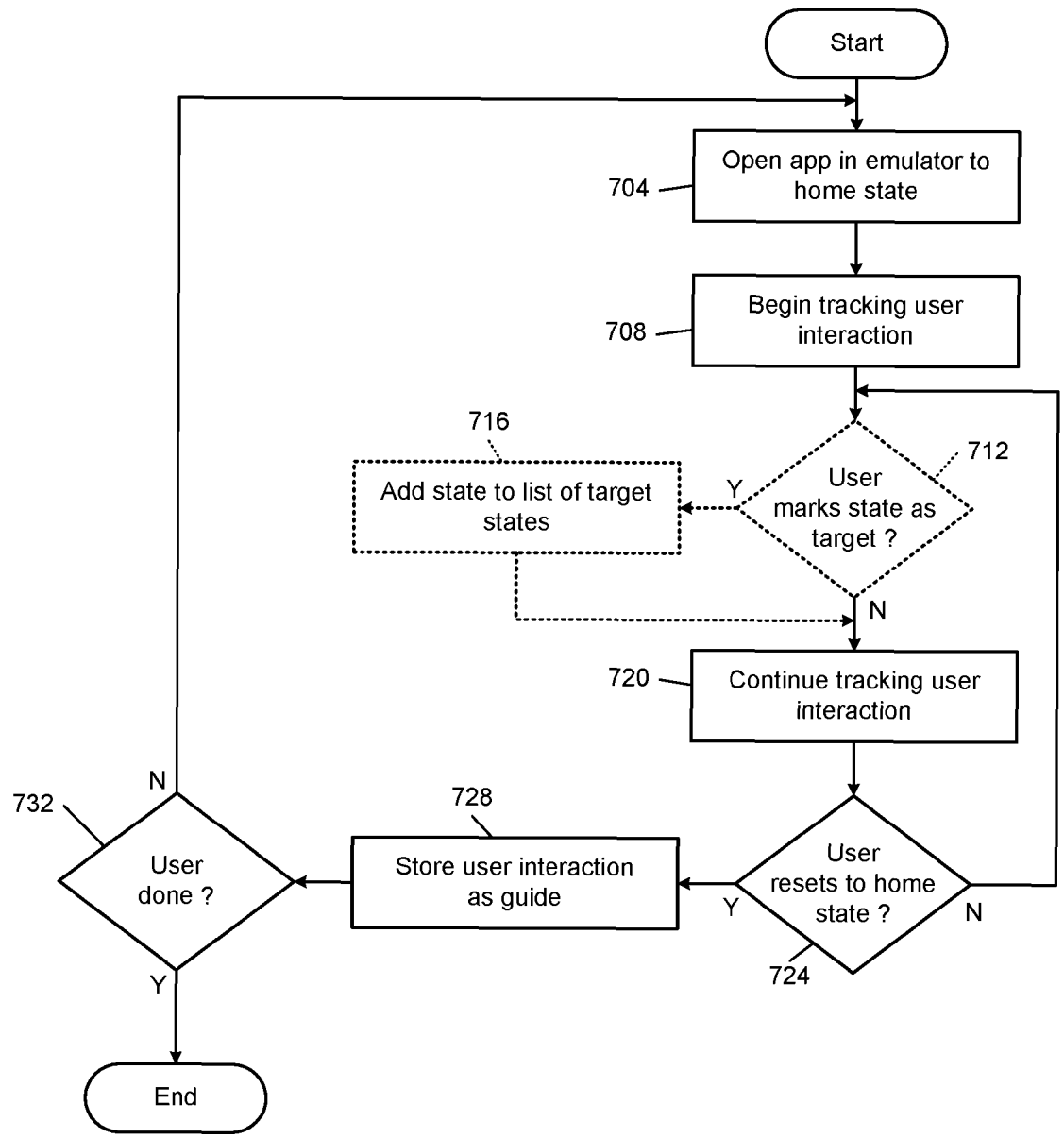
FIG. 7 is a flowchart of example operation of guide creation for an app as part of offline analysis.

In FIG. 7, example operation of breadcrumb creation by an operator begins at 704, where control opens the subject app in an emulator or simulator to the home state of the app. At 708, control begins tracking user interaction with the app, including tracking the user interface elements with which the operator interacts. At 712, if the user marks the present state as a target state, control transfers to 716; otherwise, control transfers to 720. At 716, control adds the state to a list of target states and continues at 720.

At 720, control continues tracking user interaction with the app. At 724, control determines whether the user has signaled that a new breadcrumb will be created. The user may signal this by resetting the app to the home state, using either controls within the app itself or controls provided by the emulator. If the user has reset the app to the home state, control transfers to 728; otherwise, control returns to 712. At 728, control stores the tracked user interaction as a breadcrumb, which is used for the breadcrumb for the end state. Control continues at 732, where if the user is done creating breadcrumbs, control ends; otherwise, control returns to 704.

Breadcrumb Extrapolation

Figure 8:
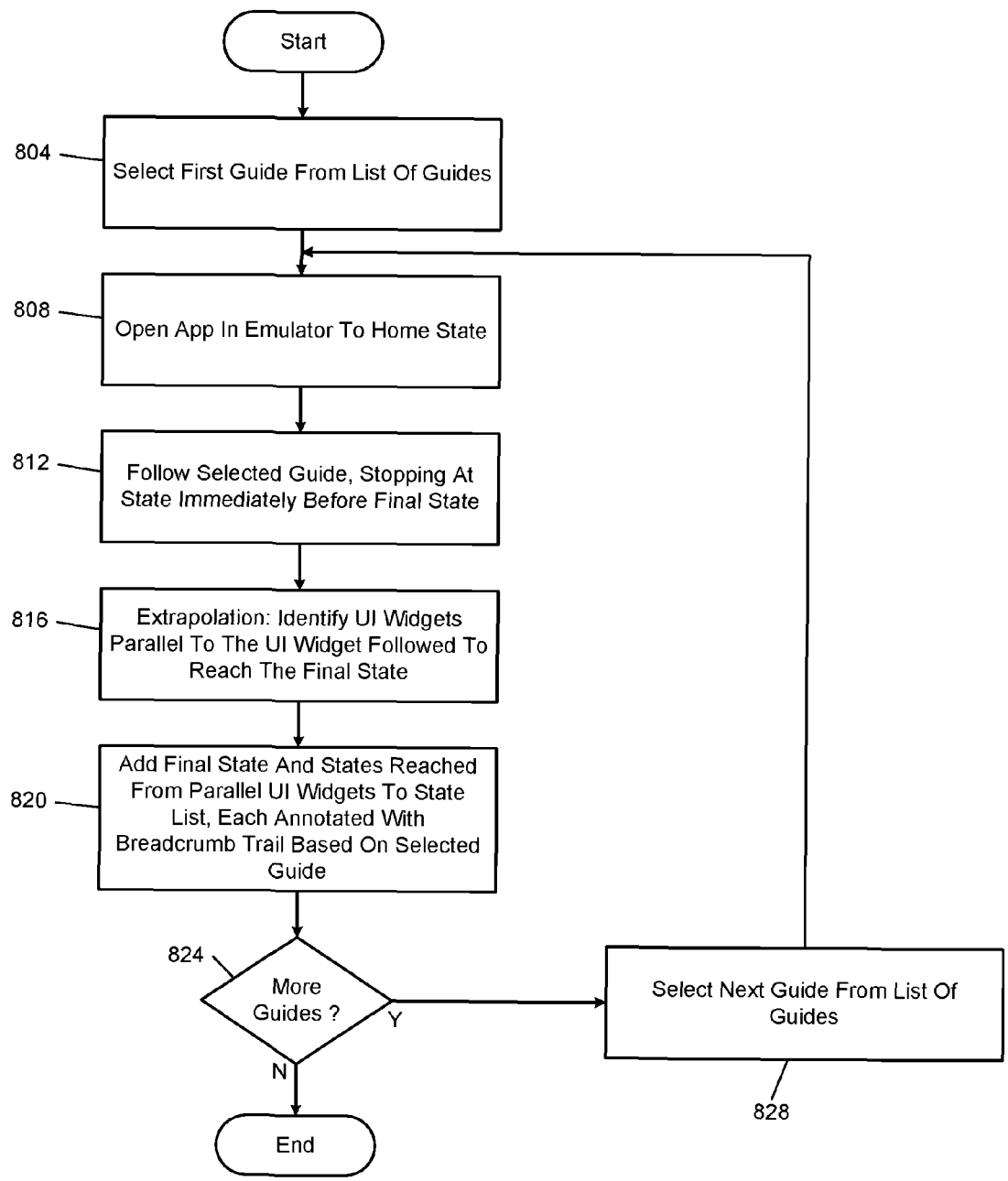
FIG. 8 is a flowchart of example extrapolation to identify additional states of interest as part of offline analysis.

Referring to FIG. 8, the operator may have established a series of breadcrumbs but not labeled any particular states as target states. For example, in some implementations, the operator may not be presented with an option to designate target states. However, operator-created breadcrumbs generally begin at a home state and end at a terminal (or, final) state. This final state may be assumed to be the state of interest for deep-linking. In other words, only terminal states are assumed to be target states. In other implementations, each state encountered along a breadcrumb is assumed to be a target state.

For example, when an operator is creating breadcrumbs for a restaurant review application, the operator may create one breadcrumb by navigating from the home state to a state containing restaurant information and reviews. This would be assumed to be a desired target state, and the link extraction controller would attempt to find additional states that have similar data for scraping. Breadcrumb creation is considered an offline (or "onboarding") process, performed prior to the breadcrumbs being available for navigating to a particular state on a user device.

Control begins at 804, where the first breadcrumb from a list of operator-created breadcrumbs is selected. At 808, control opens the app to a home state in an emulator. At 812, control follows the selected breadcrumb, stopping in the state immediately before the final state. At 816, control performs extrapolation to identify states similar to the final state. For example, control identifies UI widgets parallel to the UI widget that, when followed according to the selected breadcrumb, will reach the final state.

At 820, control adds the final state, as well as states reached from UI widgets identified as parallel, to a state list. Each of the added states is annotated with a breadcrumb based on the selected breadcrumb. The breadcrumb for the states other than the final state will diverge from the breadcrumb for the final state at the final UI event of each breadcrumb. At 824, control determines whether additional breadcrumbs are present in the list of breadcrumbs. If so, control transfers to 828; otherwise, control ends. At 828, control selects the next breadcrumb from the list of breadcrumbs and returns to 808.

Routing Library Operation

Figure 9:
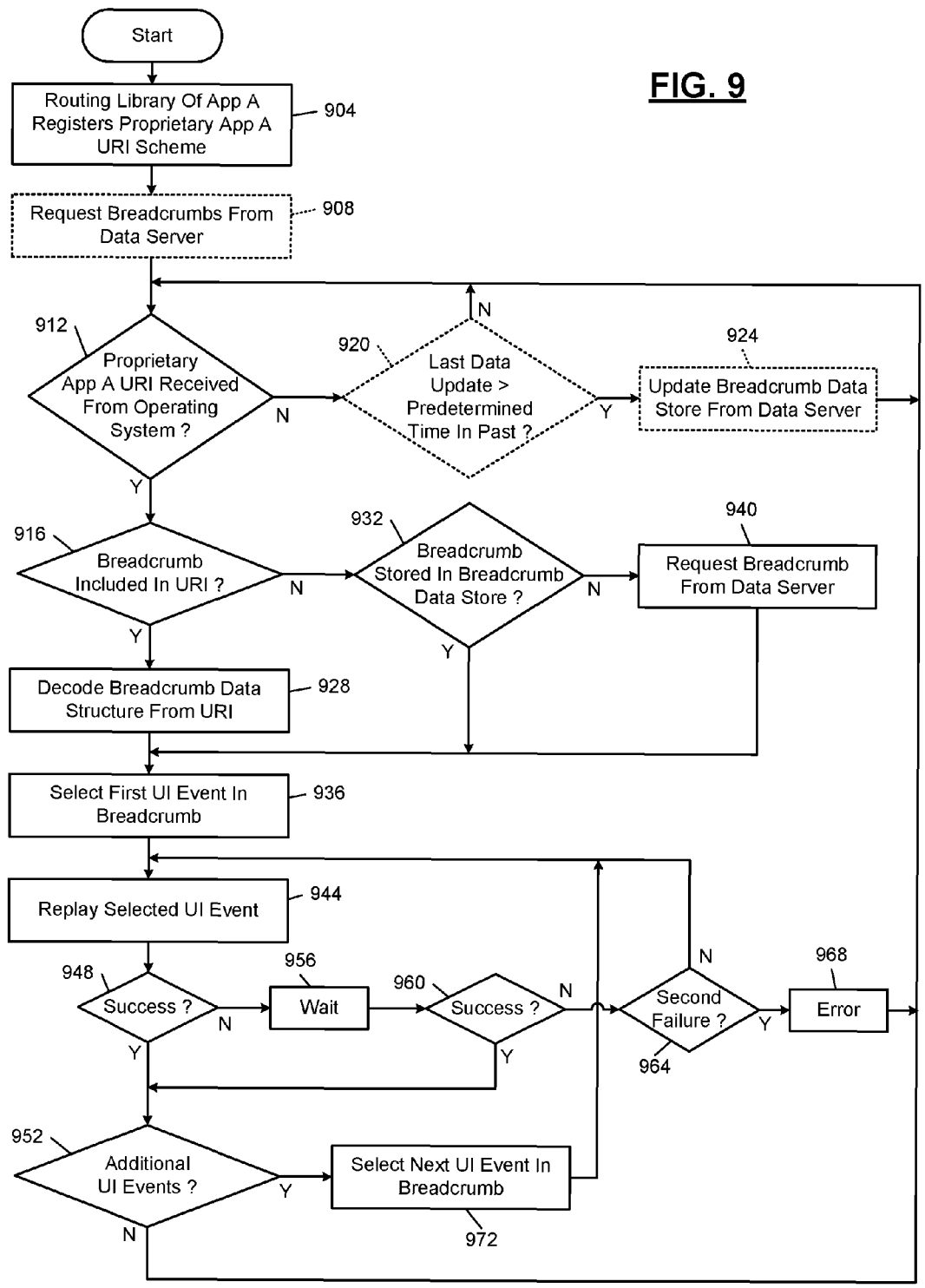
FIG. 9 is a flowchart of example routing operation within a developer's app.

In FIG. 9, example operation of a routing library integrated into an app ("App A" in this example) begins upon installation of App A. At 904, the routing library registers a proprietary scheme with the operating system. The proprietary scheme is specific to App A and is defined by the system that provides the routing library. In various implementations, this registration may be performed by the operating system as the app is being installed, where the proprietary scheme may be specified in a properties file within the app. In other words, 904 may be performed by the operating system of the user device based on parameters specified by App A due to the routing library having been incorporated into App A.

As described above, breadcrumbs that allow the routing library to navigate to certain deep states may be received in links or may be indicated by unique ID in the link. When indicated by a unique ID, the routing library may have to request the breadcrumb from a data server. In some implementations, the routing library will, therefore, pre-cache some or all breadcrumbs. This operation may be omitted if breadcrumbs will always be received within links.

In some implementations, certain breadcrumbs when encoded are longer than a maximum permitted length of a link. This maximum length may be dictated by a browser, by an operating system, or by some other technological or business restriction. These breadcrumbs may, therefore, be obtained from the data server, while shorter breadcrumbs are contained within URIs. In this way, the generator of the URI (such as a search system) prepares the URI including the breadcrumb data itself when the maximum link length will not be exceeded, while otherwise including only a unique identifier of the breadcrumb.

At 908, control requests a package of breadcrumbs from the data server. This operation may be performed the first time that App A is executed on a device. This package of breadcrumbs may include all of the breadcrumbs available for the deep states of App A. In various implementations, the package of breadcrumbs may include only those breadcrumbs relevant to the more popular states of App A. If a less popular state of App A is requested in a deep link, the routing library can request the breadcrumbs for that deep link individually.

Control continues at 912, where if a URI matching the proprietary App A scheme has been received from the operating system, control transfers to 916; otherwise, control transfers to 920. At 920, control determines whether the last data update from the data server occurred more than a predetermined time in the past. For example only, this predetermined time may be specified as a number of days. If the last data update is too far in the past, control transfers to 924; otherwise, control returns to 912. At 924, control updates a breadcrumb data store maintained by the routing library from the data server. Control continues at 912. In implementations where breadcrumbs are received in URIs and breadcrumbs are not cached by the routing library, 920, 924, and 908 may be omitted.

At 916, control determines whether the breadcrumb is included in the URI. If so, control transfers to 928; otherwise control transfers to 932. At 928, control decodes a data structure holding the breadcrumb from the URI and control continues at 936. At 932, since the breadcrumb was not included in the URI, control determines whether the breadcrumb is already stored in the breadcrumb data store. If so, control uses the breadcrumb from the breadcrumb data store and continues at 936; otherwise, control transfers to 940. At 940, control requests the breadcrumb from the data server, and when the breadcrumb is returned, control continues at 936.

At 936, control selects the first UI event in the sequence specified by the breadcrumb. At 944, control replays the selected UI event from the breadcrumb. At 948, control determines whether replaying the selected UI event successfully led to the next view or updated the current view as expected. In various implementations, control may wait for a predetermined period of time before checking for success. This predetermined period of time allows the app to respond to the UI event.

In various implementations, the breadcrumb data structure may include a specified wait time, which may apply to all UI events, or may have a separate wait time for each UI event. As part of the breadcrumb determination process, the offline analysis system may detect that certain UI events take longer for an app to respond to. In such cases, the offline analysis system may indicate that additional delay periods should be implemented before replaying another UI event.

At 948, success may instead be identified when the routing library detects that a method has been called with certain parameters corresponding to the replayed event. In other words, as part of the offline analysis, the expected response to the app to a UI event may be recorded. When this expected response is seen, success may be inferred. If, at 948, the UI event appears to have been processed successfully, control transfers to 952; otherwise, control transfers to 956.

At 956, control waits for another predetermined period of time. This additional period of time may allow for unexpectedly slow response to a UI event. Control continues at 960, where control once again attempts to verify that replaying the selected UI event has successfully led to the expected behavior. If so, control continues at 952; otherwise, control transfers to 964. At 964, if the selected UI event has been replayed twice in an attempt to obtain a successful response, control transfers to 968. At 968, an error is declared. For example, error handling may cause the app to revert to a home state and display a notification message to the user that the deep link was unsuccessful. In addition, a message may be sent to the data server indicating that the deep link was unsuccessful. Control then returns to 912. At 964, if the selected UI event has only been replayed a single time, there has not yet been a second failure, and therefore control returns to 944 to attempt to replay the selected UI event a second time.

In various implementations, success is not evaluated, and the UI events are replayed in series with the expectation that in most circumstances, the desired deep link will be reached. As a result, elements 948, 956, 960, 964, and 968 may be replaced with a simple wait step. The wait step may wait for a predetermined delay that has been empirically determined to allow the app to respond to user input. The wait step may be used in systems where UI events cannot be processed by the app as quickly as they can be replayed by the routing library. In other implementations, the wait step may involve watching for a method call resulting from the UI event. Once response of the app to the UI event has been detected, such as by watching certain method calls, control may allow the following UI event to be replayed. At 952, if there are additional UI events, control transfers to 972; otherwise, control returns to 912. At 972, control selects the next UI in the breadcrumb and returns to 944.

Example Breadcrumb Data

Figure 10:
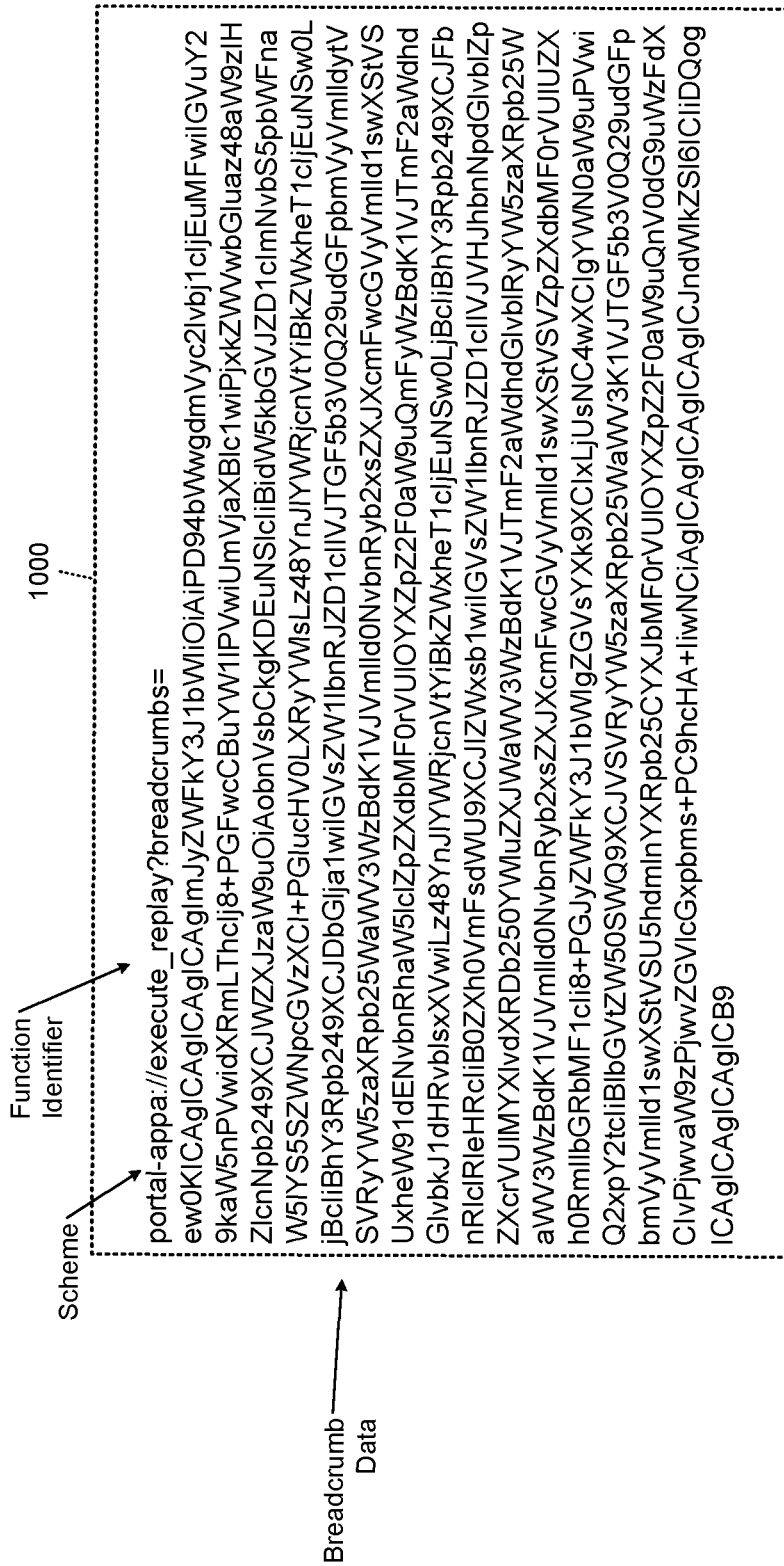
FIG. 10 is a graphical representation of an example uniform resource identifier according to an example format.

Each breadcrumb may be organized according to a predefined data structure. The data structure may be serialized, such as with Base64, an example of which is illustrated in FIG. 10. A URI 1000 includes a scheme ("portal-appa://"), a function identifier that indicates the following data represents UI events to be replayed, and breadcrumb data. The breadcrumb data encodes an ordered data structure including UI events to be replayed in order. The breadcrumb data may also include indicia (not shown) that can be used to verify that replay of a UI event resulted in the expected result. Further, the breadcrumb may include a fingerprint (not shown) of the expected state to verify that the correct final state is reached at the end of following the breadcrumb.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of operating a mobile application development system, the method comprising:

receiving a copy of a first application from a first developer;

providing a routing library to the first developer for incorporation into the first application prior to the first developer distributing the first application via a digital distribution platform;

adding a line in the routing library associated with an information property list file to modify a configuration file;

executing the first application on a processing system and, during execution, monitoring a sequence of user interface (UI) events initiated by an operator starting from an initial state and proceeding to a first state;

storing the sequence of UI events as a first data structure corresponding to the first state, wherein the initial state is not visible to the user during the routing library navigate from the initial state to a deep state of a user interest or the initial state is briefly visible to the user; and determining, by the first developer, the state of the user interest that specify a sequence of actions a user takes to takes to reach the state of the interest, wherein the routing library includes instructions that, subsequent to installation of a copy of the first application in a user device that is distinct from the mobile application development system:

receive a link from an operating system of the user device identifying the first state; and based on the first data structure corresponding to the first state, replay, in order, each UI event from the sequence of UI events to the first application, wherein the link selectively includes a unique identifier, and wherein the routing library includes instructions that retrieve the first data structure based on the unique identifier; and a data server configured to store a plurality of data structure determined by the offline analysis system including the first data structure, wherein the routing library includes instructions that, upon first execution of the first application, download at least one of data structures from the data server for storage in a data store local to the routing library, and wherein the routing library includes instructions that retrieve the first data structure from the data store in response to the unique identifier.

2. The method of claim 1, wherein:

by incorporating the routing library, the first application is configured to register a first uniform resource identifier (URI) template with the operating system;

the first URI template is a unique scheme comprising a text string ending with a colon and two forward slashes; and the text string is a concatenation of a text identifier associated with the mobile application development system and a name of the first application.

3. The method of claim 1, wherein:
the link selectively includes serialized data; and
the routing library includes instructions that decode the first data structure from the serialized data within the link.

4. The method of claim 1, wherein: storing the first data structure in a data store of the mobile
application development system, wherein the routing library includes instructions that, in response to the link, query the data server using the unique identifier; and
responding to the query by looking up the first data structure in the data store according to the unique identifier.

5. The method of claim 1, wherein the receiving the copy of the first application includes receiving a debug build of the first application from the first developer for execution on the processing system.

6. The method of claim 1, further comprising:
receiving a search commissioned by the user device;
identifying in response to the search; and
returning the identified results to the server device, wherein a first result of the identified results includes the link.

7. A mobile application development system comprising:
a developer portal comprising a first one or more hardware processors configured to:
receive a copy of a first application from a first developer,
provide a routing library to the first developer for incorporation into the first application prior to the first developer distributing the first application via a digital distribution platform, and
add a line in the routing library associated with an information property list file to modify a configuration file;
an offline analysis system comprising a second one or more hardware processors configured to:
execute the first application and, during execution, monitor a sequence of user interface (UI) events initiated by an operator starting from an initial state and proceeding to a first state, wherein the sequence of UI events is stored as a first data structure corresponding to the first state, and the initial state is not visible to the user during the routing library navigate from the initial state to a deep state of a user interest or the initial state is briefly visible to the user, and
determine, by the first developer, the state of the user interest that specify a sequence of actions a user takes to reach the state of the user interest,
wherein the routing library includes instructions that, subsequent to installation of a copy of the first application in a user device:
receive a link from an operating system of the user device identifying the first state; and
based on the first data structure corresponding to the first state, replay, in order, each UI event from the sequence of UI events to the first application,
wherein link selectively includes a unique identifier,
wherein the routing library includes instructions that retrieve the first data structure based on the unique identifier; and
a data server configured to store a plurality of data structure determined by the offline analysis system including the first data structure,
wherein the routing library includes instructions that, upon first execution of the first application, download at least one of data structures from the data server for storage in a data store local to the routing library, and
wherein the routing library includes instructions that retrieve the first data structure from the data store in response to the unique identifier.

8. The mobile application development system of claim 7, wherein, by incorporating the routing library, the first application is configured to register a first uniform resource identifier (URI) template with the operating system.

9. The mobile application development system of claim 8, wherein the first URI template is a unique scheme comprising a text string ending with a colon and two forward slashes.

10. The mobile application development system of claim 9, wherein the text string is a concatenation of a text identifier associated with the developer portal and a name of the first application.

11. The mobile application development system of claim 7, wherein:
the link selectively includes serialized data; and
the routing library includes instructions that decode the first data structure from the serialized data within the link.

12. The mobile application development system of claim 11, wherein the first data structure is formatted as JSON (JavaScript Object Notation) encoded with Base64.

13. The mobile application development system of claim 7, wherein:
the routing library includes instructions that query the data server using the unique identifier in response to the link, and
the data server responds to the query with the first data structure.

14. The mobile application development system of claim 7, wherein the developer portal is configured to receive a debug build of the first application from the first developer.

15. A system comprising:
the mobile application development system of claim 7; and
a search system configured to return results to the user device in response to a search commissioned by the user device,
wherein a first result of the returned results includes the link, and
wherein, in response to selection of the first result by a user of the user device, the link is transmitted to the routing library by the operating system.

16. The mobile application development system of claim 7, wherein the first one or more hardware processors and the second one or more hardware processors are the same one or more hardware processors.

17. A non-transitory computer-readable medium storing instructions, the instructions comprising:
receiving a copy of a first application from a first developer;
providing a routing library to the first developer for incorporation into the first application prior to the first developer distributing the first application via a digital distribution platform;
adding a line in the routing library associated with an information property list file to modify a configuration file;
executing the first application on a processing system and, during execution, monitoring a sequence of user interface (UI) events initiated by an operator starting from an initial state and proceeding to a first state;

storing the sequence of UI events as a first data structure corresponding to the first state, wherein the initial state is not visible to the user during the routing library navigate from the initial state to a deep state of a user interest or the initial state is briefly visible to the user; and determining, by the first developer, the state of the user interest that specify a sequence of actions a user takes to takes to reach the state of the interest, wherein the routing library includes instructions that, subsequent to installation of a copy of the first application in a user device that is distinct from the processing system:

receive a link from an operating system of the user device identifying the first state; and based on the first data structure corresponding to the first state, replay, in order, each UI event from the sequence of UI events to the first application, wherein the link selectively includes a unique identifier, and wherein the routing library includes instructions that retrieve the first data structure based on the unique identifier; and a data server configured to store a plurality of data structure determined by the offline analysis system including the first data structure, wherein the routing library includes instructions that, upon first execution of the first application, download at least one of data structures from the data server for storage in a data store local to the routing library, and wherein the routing library includes instructions that retrieve the first data structure from the data store in response to the unique identifier.

* * * * *